United States Patent
Matsumura

(10) Patent No.: US 9,635,366 B2
(45) Date of Patent: Apr. 25, 2017

(54) QUANTIZATION METHOD, CODING APPARATUS, AND COMPUTER-READABLE RECORDING MEDIUM STORING QUANTIZATION PROGRAM

(71) Applicant: FUJITSU LIMITED, Kawasaki-shi, Kanagawa (JP)

(72) Inventor: Hidetoshi Matsumura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 285 days.

(21) Appl. No.: 14/333,898

(22) Filed: Jul. 17, 2014

(65) Prior Publication Data

US 2015/0063443 A1    Mar. 5, 2015

(30) Foreign Application Priority Data

Aug. 30, 2013    (JP) .................. 2013-180662

(51) Int. Cl.
*H04N 7/12*    (2006.01)
*H04N 11/02*    (2006.01)
(Continued)

(52) U.S. Cl.
CPC ......... *H04N 19/126* (2014.11); *H04N 19/147* (2014.11); *H04N 19/18* (2014.11);
(Continued)

(58) Field of Classification Search
CPC .... H04N 19/126; H04N 19/147; H04N 19/19; H04N 19/18; H04N 19/91; H04N 19/93
(Continued)

(56) References Cited

U.S. PATENT DOCUMENTS

2005/0243930 A1    11/2005    Asano et al.
2009/0058691 A1    3/2009    Koo
(Continued)

FOREIGN PATENT DOCUMENTS

JP    2005-318296    11/2005
JP    2007-158430    6/2007
(Continued)

OTHER PUBLICATIONS

Karczewicz et al., "Rate Distortion Optimized Quantization", Joint Video Team (JVT) of ISO/IEC MPEG & ITU-T VCEG (ISO/IEC JTC1/SC29/WG11 and ITU-T SG16 Q.6) 27$^{th}$ Meeting: Geneva, CH, Apr. 24-29, 2008, pp. 1-8.
(Continued)

*Primary Examiner* — Andy Rao
*Assistant Examiner* — Jared Walker
(74) *Attorney, Agent, or Firm* — Staas & Halsey LLP

(57) ABSTRACT

A quantization method includes: performing, by a computer, scaling on transform coefficients of a target block; quantizing scaled transform coefficients to obtain a plurality of quantization coefficients; calculating, when calculating, based on a quantization error and a first code amount of a coded target block obtained by coding the target block, a cost of coding the target block by using a coefficient absolute value candidate of a plurality of coefficient absolute value candidates of one of the plurality of quantization coefficients, the first code amount according to a second code amount of a coded element for the one of the plurality of quantization coefficients, the second code amount being obtained by binarizing the coded element under one of a first condition and a second condition.

14 Claims, 17 Drawing Sheets

(51) Int. Cl.
*H04N 11/04* (2006.01)
*H04N 19/126* (2014.01)
*H04N 19/147* (2014.01)
*H04N 19/18* (2014.01)
*H04N 19/19* (2014.01)
*H04N 19/91* (2014.01)
*H04N 19/93* (2014.01)

(52) U.S. Cl.
CPC ............. *H04N 19/19* (2014.11); *H04N 19/91* (2014.11); *H04N 19/93* (2014.11)

(58) Field of Classification Search
USPC .................................................... 375/240.03
See application file for complete search history.

(56) References Cited

U.S. PATENT DOCUMENTS

| | | | |
|---|---|---|---|
| 2009/0067738 A1* | 3/2009 | Fuchie ................. | H04N 19/176 382/251 |
| 2009/0097550 A1 | 4/2009 | Nozawa | |
| 2009/0175332 A1* | 7/2009 | Karczewicz ......... | H04N 19/176 375/240.03 |

FOREIGN PATENT DOCUMENTS

| | | |
|---|---|---|
| JP | 2008-010943 | 1/2008 |
| JP | 2009-055384 | 3/2009 |
| JP | 2010-109912 | 5/2010 |
| JP | 2012-060210 | 3/2012 |

OTHER PUBLICATIONS

"HEVC Test Model(HM) Documentation", ITU/ISO/IEC, Jul. 2 2013(Search Date), URL:http://hevc.hhi.fraunhofer.de/HM-doc/index.html, (2 pages).

"Series H: Audiovisual and Multimedia Systems Infrastructure of audiovisual services—Coding of moving Video, High efficiency video coding", Telecommunication Standardization Sector of ITU, H.265, International Telecommunication Union, Apr. 2013, pp. 51-52**.

"Series H: Audiovisual and Multimedia Systems Infrastructure of audiovisual services—Coding of moving Video, Advanced video coding for generic audiovisual services", Telecommunication Standardization Sector of ITU, H.264, International Telecommunication Union, May 2003, pp. 46**.

Japanese Office Action dated Feb. 14, 2017 in corresponding Japanese Patent Application No. 2013-180662.

* cited by examiner

FIG. 2

```
bin_string_t tr_binrization(int synVal, int cMax, int cRiceParam){
    int prefixVal = synVal >> cRiceParam;

bin_string_t prefix_bins;
    if( prefixVal <  (cMax >> cRiceParam) ){
        prefix_bins =(0 IS ADDED TO END OF AS MANY 1S AS NUMBER INDICATED BY prefixVal);
    }else{
        prefix_bins = ((LIST OF AS MANY 1S AS NUMBER INDICATED BY (cMax >> cRiceParam);
    } bin_string_t suffix_bins;
    if( cMax > synVal ){
        int suffixVal = synVal - (prefixVal<<cRiceParam);
        suffix_bins = (BINARY REPRESENTATION OF suffixVal IN AS MANY ORDERS OF MAGNITUDE AS NUMBER INDICATED BY cRiceParam);
    }else{
        suffix_bins = (NO SUFFIX PART);
    } return (BIN STRING COMBINING prefix_bins and suffix_bins);
}
```

```
bin_string_t egk_binarization(int synVal, int k){
   bin_string_t result = (INITIAL VALUE, BLANK);
   unsigned int absV = (ABSOLUTE VALUE OF synVal);
   int stopLoop = 0;
   do {
      if( absV >= ( 1 << k ) ) {
         (1 IS ADDED TO RESULT);
         absV = absV - ( 1 << k );
         k++;
      } else {
         (0 IS ADDED TO RESULT);
         while( k-- ){
            int tmp = ( absV >> k ) & 1;
            (tmp IS ADDED TO RESULT);
         }
         stopLoop = 1;
      }
   } while( !stopLoop );
   return result;
}
```

FIG. 4

| | Descriptor |
|---|---|
| residual_coding( x0, y0, log2TrafoSize, cIdx ) { | |
|   if( transform_skip_enable_flag && !cu_transquant_bypass_flag && ( log2TrafoSize == 2 ) ) | |
|     transform_skip_flag[ x0 ][ y0 ][ cIdx ] | ae(V) |
|   last_sig_coeff_x_prefix | ae(V) |
|   last_sig_coeff_y_prefix | ae(V) |
|   if( last_sig_coeff_x_prefix>3 ) | |
|     last_sig_coeff_x_suffix | ae(V) |
|   if( last_sig_coeff_y_prefix>3 ) | |
|     last_sig_coeff_y_suffix | ae(V) |
|   lastScanPos = 16 | |
|   lastScanBlock = ( 1 << ( log2TrafoSize-2 ) ) * ( 1 << ( log2TrafoSize-2 ) ) -1 | |
|   do{ | |
|     if( lastScanPos == 0 ) { | |
|       lastScanPos = 16 | |
|       lastSubBlock-- | |
|     } | |
|     lastScanPos-- | |
|     xS = ScanOrder[ TrafoSize-2 ][ scanIdx ][ lastSubBlock ][ 0 ] | |
|     yS = ScanOrder[ TrafoSize-2 ][ scanIdx ][ lastSubBlock ][ 1 ] | |
|     xC = ( xS << 2 ) + ScanOrder[ 2 ][ scanIdx ][ lastScanPos ][ 0 ] | |
|     yC = ( yS << 2 ) + ScanOrder[ 2 ][ scanIdx ][ lastScanPos ][ 1 ] | |
|   } while( ( xC != LastSignificantCoeffX ) || ( yC != LastSignificantCoeffY ) ) | |
|   for( i = lastSubBlock; i >= 0; i-- ) { | |
|     xS = ScanOrder[ log2TrafoSize-2 ][ scanIdx ][ i ][ 0 ] | |
|     yS = ScanOrder[ log2TrafoSize-2 ][ scanIdx ][ i ][ 1 ] | |
|     inferSbDcSigCoeffFlag = 0 | |
|     if( ( i<lastSubBlock ) && ( i>0 ) ) { | |
|       coded_sub_block_flag[ xS ][ yS ] | ae(V) |
|       inferSbDcSigCoeffFlag = 1 | |
|     } | |
|     for( n = ( i == lastSubBlock ) ?lastScanPos-1:15; n >= 0; n-- ) { | |
|       xC = ( xS << 2 ) + ScanOrder[ 2 ][ scanIdx ][ n ][ 0 ] | |
|       yC = ( xS << 2 ) + ScanOrder[ 2 ][ scanIdx ][ n ][ 1 ] | |
|       if( coded_sub_block_flag[ xS ][ yS ] && ( n>0||!inferSbDcSigCoeffFlag ) ) { | |
|         sig_coeff_flag[ xC ][ yC ] | ae(V) |
|         if( sig_coeff_flag[ xC ][ yC ] ) | |
|           inferSbDcSigCoeffFlag = 0 | |
|       } | |
|     } | |
|     firstSigScanPos = 16 | |
|     lastSigScanPos = -1 | |
|     numGreater1Flag = 0 | |
|     lastGreater1ScanPos = -1 | |
|     for( n = 15; n >= 0; n-- ) { | |
|       xC = ( xS << 2 ) + ScanOrder[ 2 ][ scanIdx ][ n ][ 0 ] | |
|       yC = ( yS << 2 ) + ScanOrder[ 2 ][ scanIdx ][ n ][ 1 ] | |
|       if( sig_coeff_flag[ xC ][ yX ] ){ | |

| | | |
|---|---|---|
| if( numGreater1Flag<8 ) { | | |
|   coeff_abs_level_greater1_flag[ n ] | ae(V) | ~ 400 |
|   numGreater1Flag++ | | |
|   if( coeff_abs_level_greater1_flag[ n ] && lastGreater1ScanPos == -1 ) | | |
|     lastGreater1ScanPos = n | | |
|   } | | |
|   if( lastSigScanPos = -1 ) | | |
|     lastSigScanPos = n | | |
|   firstSigScanPos = n | | |
|   } | | |
| } | | |
| signHidden = ( lastSigScanPos-firstSigScanPos>3 && !cu_transquant_bypass_flag ) | | |
| if( lastGreater1ScanPos != -1 ) | | |
|   coeff_abs_level_greater2_flag[ lastGreater1ScanPos ] | ae(V) | |
| for( n = 15; n >= 0; n-- ) { | | |
|   xC = ( xS << 2 ) + ScanOrder[ 2 ][ scanIdx ][ n ][ 0 ] | | |
|   yC = ( yS << 2 ) + ScanOrder[ 2 ][ scanIdx ][ n ][ 1 ] | | |
|   if( sig_coeff_flag[ xC ][ yC ] && <br>     ( !sign_data_hiding_enable_flag\|\|!signHidden\|\|( n != firstSigScanPos ) ) ) | | |
|     coeff_sign_flag[ n ] | ae(V) | |
| } | | |
| numSigCoeff = 0 | | |
| sumAbsLevel = 0 | | |
| for( n = 15; n >= 0; n-- ) { | | |
|   xC = ( xS << 2 ) + ScanOrder[ 2 ][ scanIdx ][ n ][ 0 ] | | |
|   yC = ( yS << 2 ) + ScanOrder[ 2 ][ scanIdx ][ n ][ 1 ] | | |
|   if( sig_coeff_flag[ xC ][ yC ] ) { | | |
|     baseLevel = 1+coeff_abs_level_greater1_flag[ n ]+ <br>     coeff_abs_level_greater2_flag[ n ] | | |
|     if( baseLevel == ( ( numSigCoeff<8 ) ? <br>     ( ( n == lastGreater1ScanPos ) ?3:2 ) :1 ) ) | | |
|       coeff_abs_level_remainging[ n ] | ae(V) | |
|     TransCoeffLevel[ x0 ][ y0 ][ cIdx ][ xC ][ yC ] = <br>     ( coeff_abs_level_remainging[ n ]+baseLevel ) * ( 1-2 * coeff_sign_flag[ n ] ) | | |
|     if( sign_data_hiding_enable_flag && signHidden ) { | | |
|       sumAbsLevel+ = ( coeff_abs_level_remainging[ n ]+baseLevel ) | | |
|       if( n == firstSigScanPos ) && ( ( sumAbsLevel%2 ) == 1 ) ) | | |
|         TransCoeffLevel[ x0 ][ y0 ][ cIdx ][ xC ][ yC ] = <br>         -TransCoeffLevel[ x0 ][ y0 ][ cIdx ][ xC ][ yC ] | | |
|     } | | |
|     numSigCoeff++ | | |
|   } | | |
|   } | | |
| } | | |
| } | | |

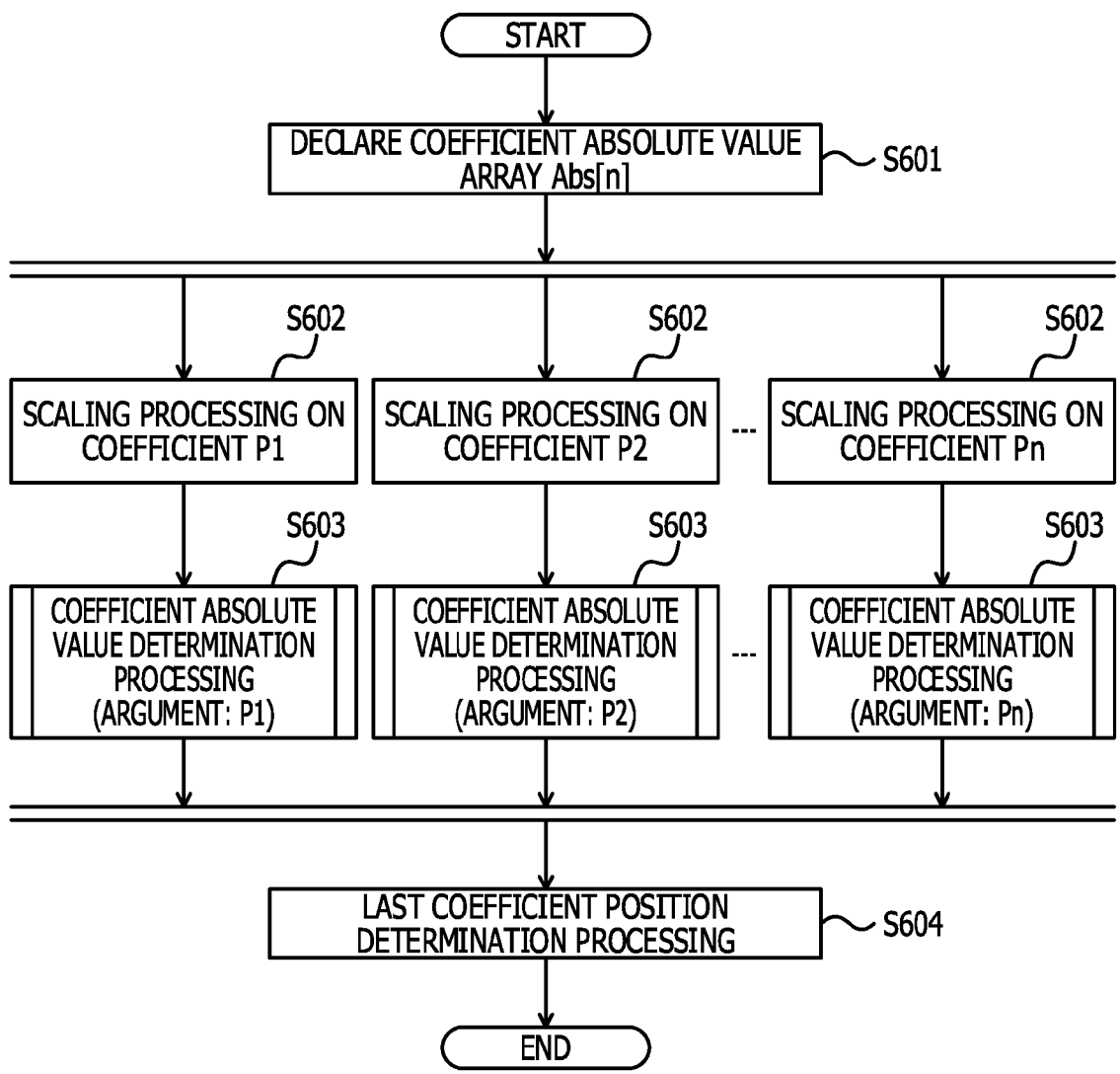

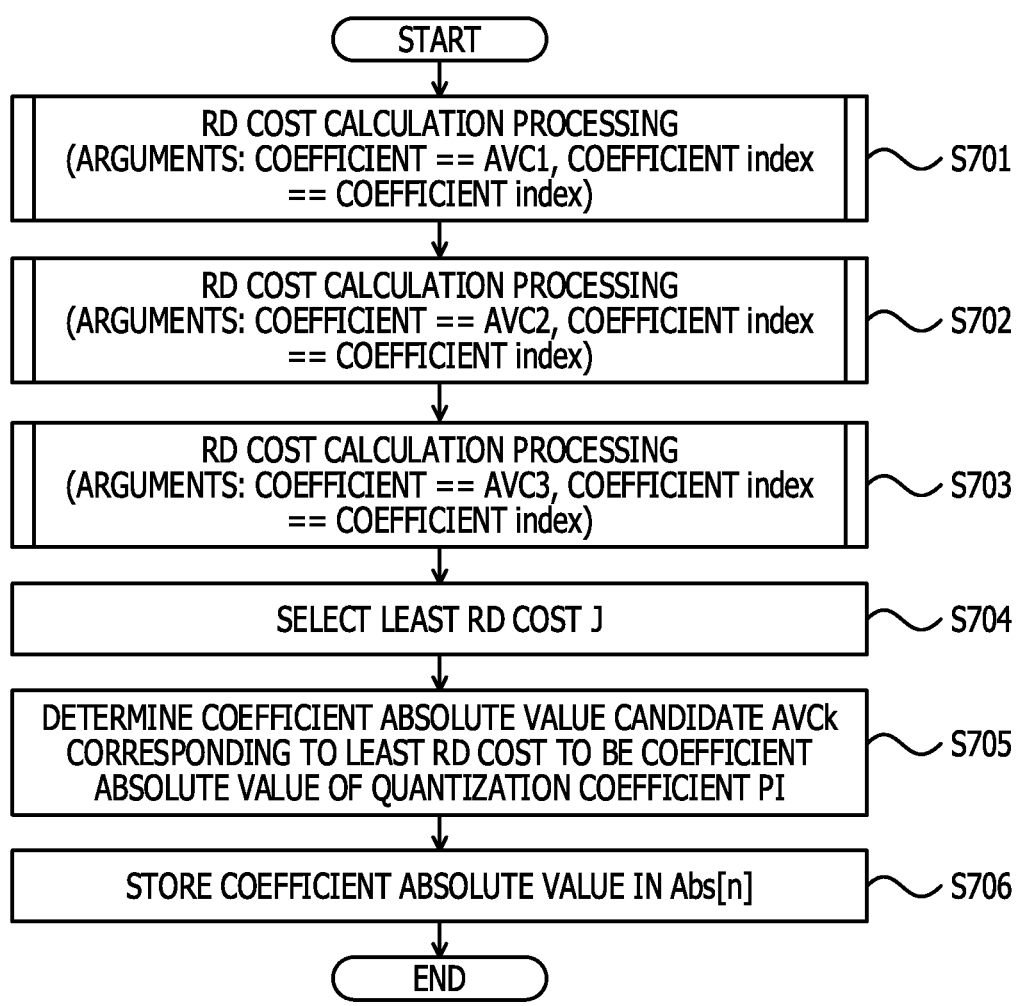

QUANTIZATION METHOD, CODING APPARATUS, AND COMPUTER-READABLE RECORDING MEDIUM STORING QUANTIZATION PROGRAM

CROSS-REFERENCE TO RELATED APPLICATION

This application is based upon and claims the benefit of priority of the prior Japanese Patent Application No. 2013-180662 filed on Aug. 30, 2013, the entire contents of which are incorporated herein by reference.

FIELD

Embodiments discussed herein are related to a quantization method, a coding apparatus, and a computer-readable recording medium that records a quantization program.

BACKGROUND

H.265, which is also called high efficiency video coding (HEVC), is one of the moving picture compression standards. In compression coding processing on moving pictures, as typified by HEVC and the like, a transform coefficient is quantized for each processing unit into which an input image has been divided, the transform coefficient being obtained by applying an orthogonal transform to a predictive residual signal, which indicates a difference between an input image and a predictive image, after which the quantized output is entropy-coded to highly efficiently compress the moving picture.

Related technologies are disclosed in Japanese Laid-open Patent Publication Nos. 2005-318296, 2008-010943, 2009-055384, 2007-158430, 2010-109912 and 2012-060210, and Marta Karczewicz, Yan Ye, Peisong Chen, Rate Distortion Optimized Quantization, searched on Jul. 2, 2013 on the Internet <URL: http://ftp3.itu.int/av-arch/jvt-site/2008_04_Geneva/JVT-AA026.zip>.

SUMMARY

According to one aspect of the embodiments, a quantization method includes: performing, by a computer, scaling on transform coefficients of a target block; quantizing scaled transform coefficients to obtain a plurality of quantization coefficients; calculating, when calculating, based on a quantization error and a first code amount of a coded target block obtained by coding the target block, a cost of coding the target block by using a coefficient absolute value candidate of a plurality of coefficient absolute value candidates of one of the plurality of quantization coefficients, the first code amount according to a second code amount of a coded element for the one of the plurality of quantization coefficients, the second code amount being obtained by binarizing the coded element under one of a first condition and a second condition, the first condition indicating a presence of the coded element, a second condition for selecting the presence of the coded element according to at least one of the coefficient absolute value candidate, a coefficient position, and a parameter.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates an example of pseudo-code;

FIG. 3 illustrates another example of pseudo-code;

FIG. 4 illustrates an example of an HEVC recommendation;

FIG. 5 illustrates a continuation of the example of the HEVC recommendations;

FIG. 6 illustrates an example of a quantization processing procedure;

FIG. 7 illustrates an example of a coefficient absolute value determination processing performed on quantization coefficient Pi;

DESCRIPTION OF EMBODIMENTS

Figure 1:
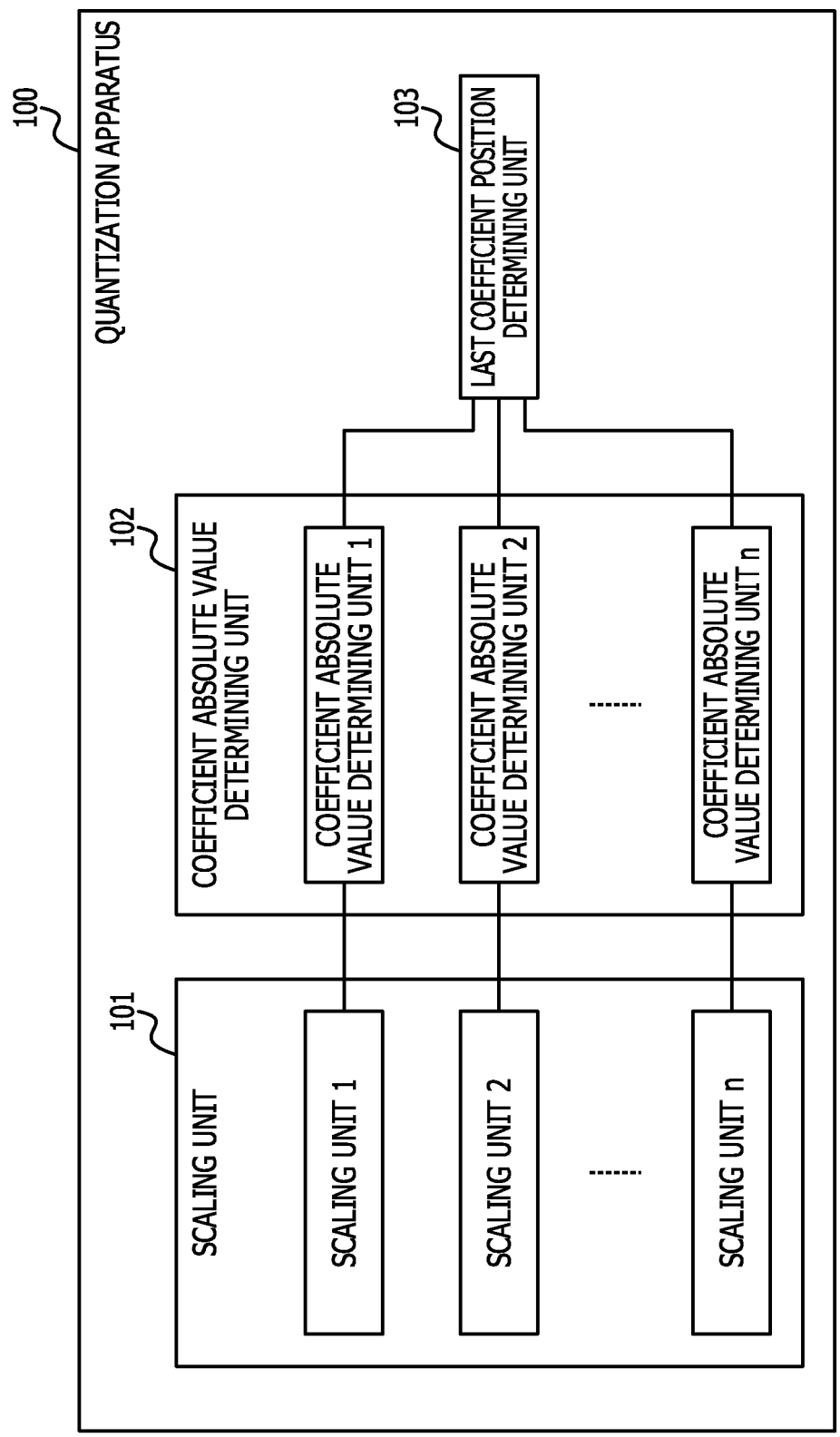
FIG. 1 illustrates an example of a functional structure of a quantization apparatus.

Quantization, for example, causes quantization noise, distorting a decoded image reproduced on a decoding side. When quantization is performed, however, the amount of information to be entropy-coded is highly efficiently compressed. In a rate distortion optimization technology, therefore, a tradeoff between distortion and a rate (amount of coding) is evaluated before any choice is selected in coding.

In selection of a coding mode or the like, for example, an RD cost is calculate for each choice and a choice that minimizes the RD cost is selected, so the tradeoff between the rate and distortion is optimized. The RD cost may be represented by, for example, distortion D in a decoded image obtained by a choice, the amount R of coding performed by using the choice, and a Lagrange multiplier $\lambda$.

In rate distortion optimized quantization (RDOQ), a rate distortion optimized technology is used to quantize a transform coefficient. In an HEVC test model (HM), which is a reference encoder of HEVC, as well, RDOQ is used.

RDOQ in an HM takes two steps, determination of each coefficient absolute value and determination of the last coefficient position. In moving picture coding, coefficients in a block are assigned an order in which they are transmitted in a bit stream by, for example, scan processing after they have been coded. This order may be referred to as a scan order.

In determination of each coefficient absolute value, the coding apparatus calculates the RD cost of each coefficient in the block in a scan order for three coefficient values obtained, respectively, in a case in which the coefficient is set to 0, in a case in which the fractional part of the quantization result (coefficient absolute value) is discarded, and in a case in which the fractional part is rounded up. The coding apparatus uses the coefficient absolute value that represents the least RD cost of the calculated RD costs as a tentative coefficient absolute value.

In determination of the last coefficient position, the coding apparatus evaluates whether or not each non-zero tentative coefficient absolute value in the block may be changed to 0 in the scan order, for example, whether or not the coefficient at the last coefficient position may be set as a next non-zero coefficient in the scan order. The coding apparatus updates the tentative coefficient absolute value, for example, from 1 to 0 according to the evaluation result.

It is evaluated for all non-zero tentative coefficient absolute values in the block whether or not there is a tentative coefficient absolute value greater than 1 at a position eligible for processing (this indicates that all non-zero tentative coefficient absolute values in the block are 1). Whether or not each coefficient can be changed to 0 is determined according to whether or not the RD cost of the entire block after the coefficient has been changed to 0 is lower than the RD cost before the coefficient has been changed to 0.

If the RD cost after the change is lower than the RD cost before the change, the RD cost after the change is set as the best cost. The best cost may be, for example, the RD cost of the entire block of tentative coefficient absolute value obtained in determination of each absolute coefficient or the RD cost obtained when all coefficients are 0, whichever is smaller, in their initialization step of determination of the last coefficient position. The tentative coefficient absolute value at the completion of determination of the last coefficient position may be the last coefficient absolute value.

In HEVC, the rate (the amount of coding) used for RD cost calculation in RDOQ is obtained as a result of context-adaptive binary arithmetic coding (CABAC) processing. In CABAC processing, symbols (syntax elements) for coefficient absolute values, last coefficient position information, and the like are processed in series, whereby long processing time is taken.

RDOQ processing may be performed as fast as possible. If, for example, a next block to be coded after the target block is an intra prediction block, a processing result of the target block (locally decoded image before LoopFilter processing) may be referenced. In this case, a delay in RDOQ may become a delay for starting intra prediction of a next block to be processed, and the entire coding processing may be delayed.

For example, to select a coding mode in which the amount of coding is minimized, the amount of coding is measured as a bin count before arithmetic coding with a large processing load from coded elements obtained by coding an input moving picture signal in a plurality of coding modes through predictive coding.

For example, the amount of data generated in an output obtained from a converting unit that converts a data string of each picture of a moving image to a binary string is estimated, and quantization control is performed in succession. In addition, the generated data is detected from the output from an arithmetic coding unit that converts the binary string obtained as a result of conversion by the converting unit to an arithmetic coded string, after which the estimated amount of generated data is corrected.

For example, to control a rate, the amount of bits to be generated is predicted from the amount of bin by using a prediction function the order of which changes when the amount of bin is increased beyond a threshold. For example, to control a rate, a coding amount inferring unit references a conversion table according to a quantized value obtained from a quantizing unit to estimate the amount of coding after CABAC and a rate control deciding unit returns a coding condition suitable for the amount of control to a prediction processing unit and the quantization unit according to the estimated amount of coding.

For example, in an image coding apparatus with an MB pipeline structure, the binary symbol length of an nth MB may be reflected in a quantization parameter for an (n+1)th MB. For example, adaptive quantization that minimizes approximation error is performed under a condition in which a given amount of coding is limited, without depending on an input signal distribution.

Since there is a dependency relation among a plurality of pieces of processing in a cost calculation operation in RDOQ processing, the plurality of operations in the cost calculation are difficult to perform concurrently. Therefore, it may be difficult to improve processing performance in RDOQ processing.

For example, in HEVC, there is a dependency relation among syntax elements used to calculate each RD cost in RDOQ processing. Therefore, the RD cost of the current coefficient or at the coefficient position is affected by the value of immediately preceding coefficient absolute values, whether or not an immediately preceding non-zero coefficient has been changed to 0, or another condition. Accordingly, the plurality of operations in the cost calculation in RDOQ processing to optimize the coefficient absolute value are not concurrently performed for each coefficient. By contrast, in quantization processing in which rate distortion optimization (RDO) is not performed, there is no dependency relation among coefficients, so concurrent processing may be performed for each coefficient. It may be difficult to perform RDOQ processing in processing time almost the same as in quantization processing in which RDO is not performed.

FIG. 1 illustrates an example of a functional structure of a quantization apparatus. The quantization apparatus 100 in FIG. 1 includes a scaling unit 101, a coefficient absolute value determining unit 102, and a last coefficient position determining unit 103. Each functional unit may include, for example, AND circuits, which are conjunction circuits, inverters, which are inversion logic circuits, OR circuits, which are disjunction circuits, NOR circuits, which are non-disjunction circuits, and flip-flops (FFs), which are latch circuits. Each functional part may include a field programmable gate array (FPGA) in which descriptions of functions defined in, for example, Verilog hardware description language (HDL) are logically combined. The function of each functional part may be implemented by, for example, causing a central processing unit (CPU) to execute a program stored in a memory. Alternatively, the function may be implemented by an accelerator or by dividing processing between the CPU and the accelerator.

The scaling unit 101 includes scaling units 1 to n, which respectively perform scaling on transform coefficients C1 to Cn in a target block B. The target block B may be a processing unit that performs an orthogonal transform on a predictive residual signal, which indicates a difference between an input image and a predictive image. The input image may be a moving picture. The predictive image may be an image created by, for example, intra prediction or motion compensating prediction.

The target block B may be, for example, a transform block (TB). It has a processing unit, which is any one of 4 pixels×4 pixels, 8 pixels×8 pixels, 16 pixels×16 pixels, and 32 pixels×32 pixels. Transform coefficients C1 to Cn may be coefficients (for example, discrete cosine transform (DCT) coefficients) which are used to apply an orthogonal transform such as a DCT to each pixel in the target block B. Transform coefficients C1 to Cn represent frequency components in the target block B to which an orthogonal transform has been applied.

Any one of scaling units 1 to n may be represented as scaling unit i. Any one of transform coefficients C1 to Cn in the target block B may be represented as transform coefficient Ci (i=1, 2, . . . , n). Transform coefficients C1 to Cn may be in a reverse order, which is reverse to a scanning order. A processing unit in which entropy coding such as variable-length coding is applied to results obtained after the target block B has been orthogonally transformed and quantized may be represented as a sub-block sb.

For example, the scaling unit i performs scaling on transform coefficient Ci by multiplying the absolute value of transform coefficient Ci by a value according to a coefficient position, a scaling list value, the feature of the target block B, or a quantization parameter value.

The coefficient position may be, for example, information that includes the block size of the target block B and the position of the transform coefficient Ci in the target block B. The scaling list value may be a value of a quantization matrix used to adjust the weight of quantization according to a frequency. A parameter representing the feature of the target block B may include, for example, activity which is used in TM5 rate control. Activity is a value obtained by dividing the sum of squares of differences, each of which is a difference between the value of each pixel in the target block B and the average of the values of pixels in the target block B, by the number of pixels in the target block B. The quantization parameter value is the value of a quantization parameter that represents the value of a divisor used in quantization.

The coefficient absolute value determining unit 102, which includes coefficient absolute value determining units 1 to n, determines the coefficient absolute values of quantization parameters P1 to Pn that are obtained by quantizing the scaling results of transform coefficients C1 to Cn. Any one of coefficient absolute value determining units 1 to n may be represented as coefficient absolute value determining unit i.

For example, coefficient absolute value determining unit i performs quantization by shifting the scaling result of transform coefficient Ci to the right by an amount determined from a coefficient position, a scaling list value, the feature of the target block B, or a quantization parameter value.

Coefficient absolute value determining unit i obtains a coefficient absolute value candidate AVC1 of quantization coefficient Pi by rounding up the frictional part of the quantization result obtained by quantizing the scaling result of transform coefficient Ci. Coefficient absolute value determining unit i also obtains a coefficient absolute value candidate AVC2 of quantization coefficient Pi by discarding the frictional part of the quantization result. Coefficient absolute value determining unit i also obtains a coefficient absolute value candidate AVC3 of quantization coefficient Pi by setting the quantization result to 0.

Coefficient absolute value determining unit i calculates RD costs J1 to J3 for coefficient absolute value candidates AVC1 to AVC3 of quantization coefficient Pi. The RD cost J may be an evaluation value which is used to optimize a tradeoff between distortion and a rate (amount of coding) in RDOQ processing. The RD cost J may be used as an evaluation value which is used to evaluate a cost in the coding of the target block B in optimization of the coefficient absolute value of quantization coefficient Pi.

For example, coefficient absolute value determining unit i calculates RD cost Jk (k=1, 2, 3) according to equation (1) below in a case in which the coefficient absolute value of quantization coefficient Pi is used as coefficient absolute value candidate AVCk. Jk is the RD cost J for a one-frequency component in the target block B in a case in which the coefficient absolute value of quantization coefficient Pi is used as coefficient absolute value candidate AVCk. Dk is quantization error (distortion of a decoded image) in a case in which the target block B has been coded by using the coefficient absolute value of quantization coefficient Pi as coefficient absolute value candidate AVCk. Quantization error Dk is evaluated by, for example, the sum of square error between a decoded pixel value and an input pixel value. Rk is the amount of coding performed in a case in which the target block B has been coded by using the coefficient absolute value of quantization coefficient Pi as coefficient absolute value candidate AVCk. $\lambda$ is a Lagrange multiplier.

$$Jk = Dk + \lambda \cdot Rk \qquad (1)$$

Coefficient absolute value determining unit i calculates the amount Rk of the result obtained by coding the target block B according to a code amount r of a coded element, the code amount r being obtained by binarizing the coded element under any one of conditions (A) and (B) below.

(A) Condition to indicate whether or not a coded element involved in quantization coefficient Pi is present (B) Condition to select presence or not-presence of a coded element according to at least any one of the coefficient absolute value candidate AVC of quantization coefficient Pi, the coefficient position, and a particular parameter The particular parameter may be a parameter other than transform coefficients C1 to Cn and quantization parameters P1 to Pn. For example, the particular parameter may be a picture type (I picture, P picture, or B picture), information indicating a picture to be coded in a reference structure, a prediction mode (intra or inter), a quantization parameter, or a scaling list.

The coded element may be a syntax element included in a bit stream. Examples of the coded element are indicated in (i) to (v) below.

(i) Information indicating whether or not quantization coefficient Pi at each position is a non-zero, the position being at a distance from the last coefficient position in a quantization coefficient list L, in which quantization coefficients P1 to Pn in the target block B are listed in a reverse scan order, toward the top of the quantization coefficient list L. (The information may correspond to sig_coeff_flag.)

(ii) Information indicating whether or not the coefficient absolute values of up to seven non-zero coefficients counted from the last position in the quantization coefficient list L, in which quantization coefficients P1 to Pn in the target block B are listed in a reverse scan order, are 1. (The information may correspond to coeff_abs_level_greater1_flag.)

(iii) Information indicating whether or not the coefficient absolute value of a first quantization coefficient Pi having a coefficient absolute value of 2 or more that is found starting from the last position in the quantization coefficient list L, in which quantization coefficients P1 to Pn in the target block B are listed in a reverse scan order, is 3 or more. (The information may correspond to coeff_abs_level_greater2_flag.)

(iv) Information indicating the sign of a non-zero coefficient in the quantization coefficient list L, in which quantization coefficients P1 to Pn in the target block B are listed in a reverse scan order. (The information may correspond to coeff_sign_flag.)

(v) Information obtained by binarizing the coefficient absolute value of quantization coefficient Pi with a coefficient absolute value of 2 or more. (The information may correspond to coeff_abs_level_remaining.)

Coded elements, for example, those described in (i) to (v) above may be obtained only if the quantization coefficient at a former position in the scan order has been determined. Therefore, there may be a dependency relation among a plurality of pieces of processing in an RD cost J calculation operation in RDOQ processing, so the plurality of pieces of RD cost J calculation operation processing may not be concurrently performed.

The quantization apparatus 100 may concurrently perform a plurality of pieces of processing in an RD cost J calculation operation by, for example, performing an approximation operation to remove the dependency relation among quantization coefficients in an RD cost J calculation operation in RDOQ processing.

For example, to calculate the code amount r of each coded element, coefficient absolute value determining unit i, as indicated conditions (A) and (B) above, selects presence or not-presence of each coded element according to an initial setting or information that does not depend on any other quantization coefficient. To calculate the core amount R, coefficient absolute value determining unit i accumulates the calculated code amount r of each coded element. The code amount r is, for example, a bin count corresponding to the coded element. The bin count is the number of bits in a bit string (bin) obtained by binarizing the coded element.

As a method of binarizing a coded element, a binarization process for coeff_abs_level_remaining, fixed length (FL) binarization, truncated rice (TR) binarization, and k-th order Exp-Golomb (EGk) binarization, for example, may be used.

A binarization process for coeff_abs_level_remaining is processing to binarize the coefficient absolute value of quantization coefficient Pi with a coefficient absolute value of 2 or more. In FL binarization, one-bit flag information is binarized. A flag itself to be binarized in FL binarization may be a bin.

Figure 14:
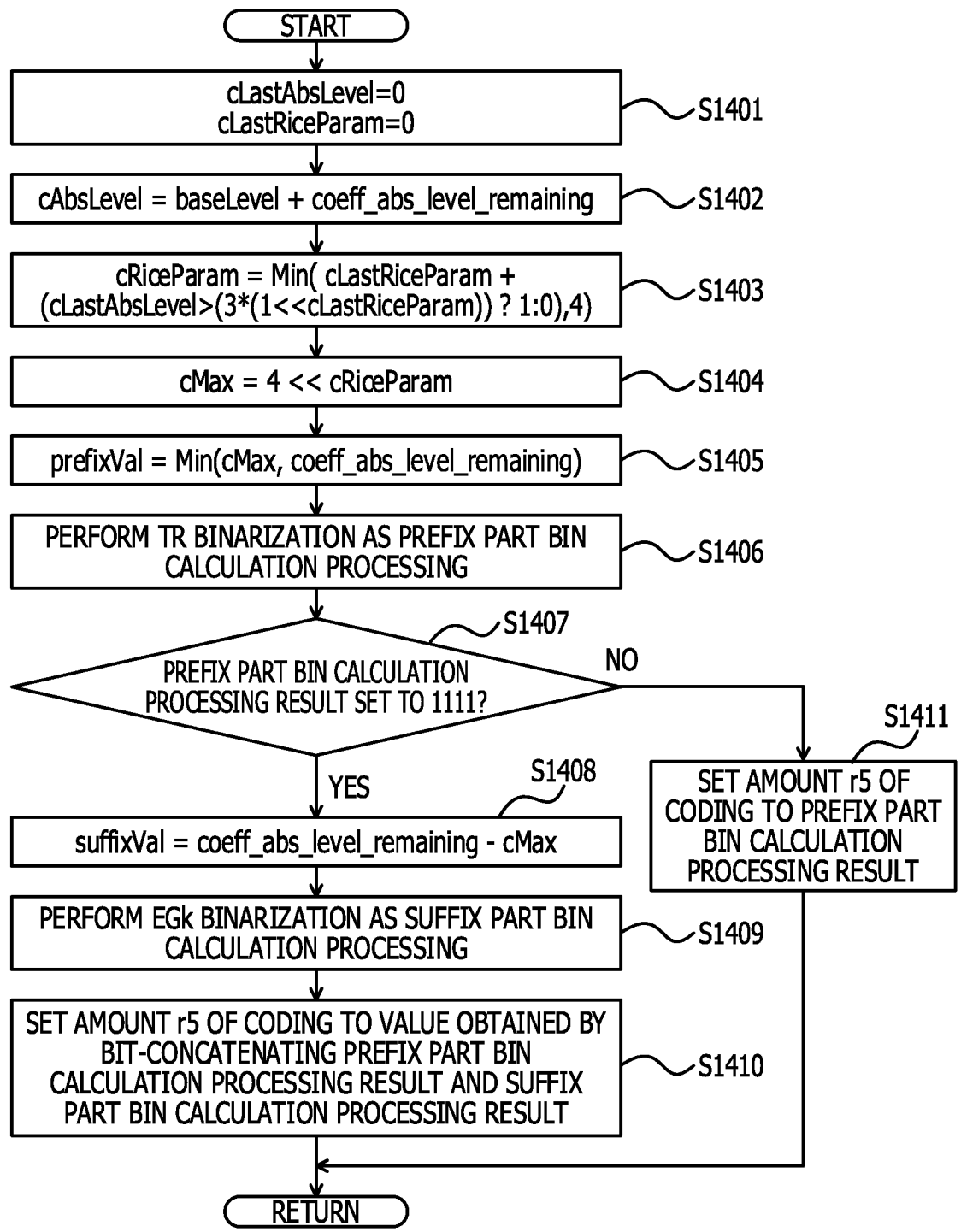
FIG. 14 illustrates an example of a coeff_abs_level_remaining coding amount calculation processing.

TR binarization is binary processing performed in a binarization process for coeff_abs_level_remaining (see operation S1406 in FIG. 14).

FIG. 2 illustrates an example of pseudo-code. In FIG. 2, pseudo-code in TR binarization is illustrated. In pseudo-code 200 in FIG. 2, processing in TR binarization is represented by pseudo-code in C. In TR binarization, inputs are synVal (syntax element value), cMax (maximum length of the prefix part), and cRiceParam (Rice coding parameter) and outputs are bin strings. bin_string_t is a type representing a bin string.

TR binarization is a type of code called Rice coding. Rice coding is a type of coding method for positive integers of a type which is called Golomb coding. In Golomb coding, the quotient and remainder obtained by diving an integer to be coded by parameter m are coded and the coded results are bit-linked.

In the HEVC standard, the coded quotient and remainder are respectively called the prefix part and the suffix part. Golomb coding in which m is a power of 2 like m=2—n is called Rice coding; cRiceParam in TR binarization is equivalent to n.

EGk binarization is binary processing performed in a binarization process for coeff_abs_level_remaining (see operation S1409 in FIG. 14).

FIG. 3 illustrates an example of pseudo-code. FIG. 3 illustrates processing in EGk binarization. In pseudo-code 300 in FIG. 3, processing in EGk binarization is represented by pseudo-code in C. In EGk binarization, inputs are synVal (syntax element value) and k (parameter in Golomb coding) and outputs are bin strings. bin_string_t is a type representing a bin string.

Coefficient absolute value determining unit i illustrated in FIG. 1 determines the coefficient absolute value of quantization coefficient Pi according to calculated RD costs J1 to J3. For example, coefficient absolute value determining unit i determines coefficient absolute value candidate AVCk corresponding to the least RD cost J of RD costs J1 to J3 as the coefficient absolute value of quantization coefficient Pi.

The last coefficient position determining unit 103 determines the last coefficient position of the target block B according to the coefficient absolute values of quantization coefficients P1 to Pn that have been determined by the coefficient absolute value determining unit 102. The last coefficient position is information indicating the position of the last quantization coefficient with a non-zero coefficient absolute value in the quantization coefficient list L, in which quantization coefficients P1 to Pn are listed in a reverse scan order.

For example, the last coefficient position determining unit 103 calculates RD cost J[i] of the quantization coefficient list L, in which the coefficient absolute values of determined quantization coefficients P1 to Pn are listed in a reverse scan order, according to equation (2). J[i] is an RD cost of all frequency components in the target block B in a case in which quantization coefficient Pi is assumed to be at the last coefficient position. D[i] is quantization error (distortion of a decoded image) in a case in which the target block B has been coded, assuming quantization coefficient Pi to be at the last coefficient position. R[i] is the code amount in case in which the target block B has been coded, assuming quantization coefficient Pi to be at the last coefficient position. λ is a Lagrange multiplier.

$$J[i]=D[i]+\lambda \cdot R[i] \quad (2)$$

The last coefficient position determining unit 103 calculates RD cost J[0] according to equation (2) in a case in which all quantization coefficients P1 to Pn are 0. The last coefficient position determining unit 103 sets RD cost J[i] or RD cost J[0], whichever is smaller, as the minimum RD cost J[min].

The last coefficient position determining unit 103 calculates RD cost J[i] according to equation (2) in a case in which a non-zero coefficient absolute value in the quantization coefficient list L is changed to 0 in the scan order. The last coefficient position determining unit 103 compares calculated RD cost J[i] with the RD cost J[min].

If RD cost J[i] is smaller, the last coefficient position determining unit 103 sets RD cost J[i] as the RD cost J[min] and calculates RD cost J[i] in a case in which a next non-zero coefficient absolute value in the quantization coefficient list L is changed to 0. If the RD cost J[min] is smaller, the last coefficient position determining unit 103 determines the last coefficient position in the quantization coefficient list L at that time as the last coefficient position of the target block B.

In RD cost J calculation which is used in RDOQ processing in the quantization apparatus 100, the code amount r of the coded element related to the quantization coefficient Pi in the target block B may be obtained without depending on the values of other quantization coefficients in the target block B. Accordingly, a plurality of pieces of processing involved in a calculation operation for an RD cost J (RD cost Jk, for example) in RDOQ processing may be concurrently performed in substantially the same processing time as in quantization processing in which RDO is not performed. Therefore, processing performance may be improved.

FIGS. 4 and 5 illustrate an example of an HEVC recommendation. In FIGS. 4 and 5, coded elements (syntax elements) in the target block B are illustrated.

In the recommendation 400 illustrated in FIGS. 4 and 5, coded elements included in a bit stream in HEVC and their sequence are indicated. For example, the recommendation 400 includes coded elements indicated below. The number immediately before each coded element indicates the sequence position of the coded element included in the bit stream.

(0) transform_skip_flag transform_skip_flag is a flag that selects for each target block B whether or not to perform an orthogonal transform.

(1) last_sig_coeff_x_prefix, last_sig_coeff_y_prefix, last_sig_coeff_x_suffix, and last_sig_coeff_y_suffix last_sig_coeff_x_prefix, last_sig_coeff_y_prefix, last_sig_coeff_x_suffix, and last_sig_coeff_y_suffix are each information indicating the last coefficient position in the target block B.

(1.5) coded_sub_block_flag coded_sub_block_flag is a flag indicating for each sub-block sb whether or not at least one non-zero coefficient is present for each sub-block sb.

(2) sig_coeff_flag sig_coeff_flag is a flag indicating whether or not the quantization coefficient at each position to the left of the last coefficient position (toward the top) in the quantization coefficient list L is a non-zero.

(3) coeff_abs_level_greater1_flag coeff_abs_level_greater1_flag is a flag indicating whether or not up to seven non-zero coefficients counted from the high-frequency side (last position) in the quantization coefficient list L have an absolute value of 1.

(4) coeff_abs_level_greater2_flag coeff_abs_level_greater2_flag is a flag indicating whether or not the value of a first quantization coefficient having a coefficient absolute value of 2 or more that is found starting from the high-frequency side (last position) in the quantization coefficient list L is 3 or more.

(5) coeff_sign_flag coeff_sign_flag is a flag indicating the sign of a non-zero coefficient in the quantization coefficient list L. If the sign is a plus sign, for example, coeff_sign_flag indicates 0; if the sign is a minus sign, coeff_sign_flag indicates 1.

(6) coeff_abs_level_remaining coeff_abs_level_remaining indicates information obtained by subtracting a value one more than the sum of coeff_abs_level_greater1_flag and coeff_abs_level_greater2_flag from a coefficient absolute value and binarizing the subtraction result.

The code amount Rk which is used to obtain RD cost Jk is calculated. For example, the target block B may be processed in four pixels×four pixels units. A coded element which is used in the calculation of the code amount Rk may be (2) sig_coeff_flag, (3) coeff_abs_level_greater1_flag, (4) coeff_abs_level_greater2_flag, (5) coeff_sign_flag, or (6) coeff_abs_level_remaining.

About (2) sig_coeff_flag

Coefficient absolute value determining unit i calculates the code amount r1 of sig_coeff_flag involved in quantization coefficient Pi according to any one of conditions (2-1), (2-2), and (2-3) described below. For example, coefficient absolute value determining unit i calculates the bin count corresponding to sig_coeff_flag involved in quantization coefficient Pi as the code amount r1.

(2-1) A coded element is present for each of quantization coefficients P1 to Pn.

(2-2) A coded element is present for none of quantization coefficients P1 to Pn.

(2-3) Whether or not a coded element is present is set depending on the coefficient position of quantization coefficient Pi or a particular parameter.

As one condition that a coded element is present for a certain quantization coefficient, a standard in HEVC, for example, includes a condition that sig_coeff_flag is a quantization coefficient at a position toward the low frequency side from the last coefficient position, which is indicated in last_sig_coeff_x/y_prefix/suffix, in the target block B. To determine whether or not a coded element is present for a certain quantization coefficient, information indicating whether or not a non-zero coefficient is present at a position toward the high-frequency side from the quantization coefficient, for example, may be used and a dependency relation may arise in processing among quantization coefficients.

Under conditions (2-1) and (2-2), the presence or absence of sig_coeff_flag involved in a certain quantization coefficient does not depend on the value of any other quantization coefficient, so a dependency relation in processing among quantization coefficients may be removed for sig_coeff_flag.

Under condition (2-3), for example, a coefficient position that has the highest probability with which the frequency component in the target block B becomes the highest may be inferred from the particular parameter and last_sig_coeff_x_prefix, last_sig_coeff_y_prefix, last_sig_coeff_x_suffix, or last_sig_coeff_y_suffix may indicate the inferred coefficient position. In this case, there may be no sig_coeff_flag involved in the quantization coefficients at positions shifted from this coefficient position toward the high-frequency side and there may be sig_coeff_flag involved in the quantization coefficients at positions shifted from this coefficient position toward the low-frequency side. The particular parameter may not depend on the coefficient values in the target block B or the sub-block sb. Therefore, under condition (2-3), a dependency relation in processing among quantization coefficients may be removed for sig_coeff_flag.

If, for example, coefficient absolute value determining unit i determines that sig_coeff_flag involved in quantization coefficient Pi is present, coefficient absolute value determining unit i sets the code amount r1 of sig_coeff_flag involved in quantization coefficient Pi to 1. If coefficient absolute value determining unit i determines that sig_coeff_flag involved in quantization coefficient Pi is not present, coefficient absolute value determining unit i sets the code amount r1 of sig_coeff_flag involved in quantization coefficient Pi to 0.

About (3) coeff_abs_level_greater1_flag

Coefficient absolute value determining unit i calculates the code amount r2 of coeff_abs_level_greater1_flag involved in quantization coefficient Pi according to any one of conditions (3-1), (3-2), and (3-3) described below. For example, coefficient absolute value determining unit i calculates the bin count corresponding to coeff_abs_level_greater1_flag involved in quantization coefficient Pi as the code amount r2.

(3-1) A coded element is not present for quantization coefficients Pi with a coefficient absolute value of a certain non-negative integer or smaller and is present for a coded element for other quantization coefficients Pi.

(3-2) A coded element is present for quantization coefficients Pi with a coefficient absolute value of a certain non-negative integer or smaller and is not present for other quantization coefficients Pi.

(3-3) A coded element is not present for quantization coefficients Pi with a coefficient absolute value of a certain non-negative integer or smaller, and for other quantization coefficients Pi, whether or not a coded element is present is set depending on the coefficient position of quantization coefficient Pi or a particular parameter.

In a standard in HEVC, coeff_abs_level_greater1_flag is present for up to seven non-zero coefficients counted from the high-frequency side in the sub-block sb. To determine this, information indicating the number of non-zero coefficients at positions toward the high-frequency side from the quantization coefficient may be used, so a dependency relation may arise in processing among quantization coefficients.

Under conditions (3-1) and (3-2), the presence or absence of coeff_abs_level_greater1_flag involved in a certain quantization coefficient depends only on the value (coefficient absolute value candidate) of the quantization coefficient, so a dependency relation in processing among quantization coefficients may be removed for coeff_abs_level_greater1_flag.

In condition (3-3), it is inferred from, for example, a particular parameter whether or not each quantization coefficient in the target block B is any one of up to seven non-zero coefficients counted from the high-frequency side to determine whether or not the coded element is present. The particular parameter may not depend on the coefficient values in the target block B or the sub-block sb. Therefore, under condition (3-3), a dependency relation in processing among quantization coefficients may be removed for coeff_abs_level_greater1_flag.

If, for example, coefficient absolute value determining unit i determines that coeff_abs_level_greater1_flag involved in quantization coefficient Pi is present, coefficient absolute value determining unit i sets the code amount r2 of coeff_abs_level_greater1_flag involved in quantization coefficient Pi to 1. If coefficient absolute value determining unit i determines that no coeff_abs_level_greater1_flag involved in quantization coefficient Pi is not present, coefficient absolute value determining unit i sets the code amount r2 of coeff_abs_level_greater1_flag involved in quantization coefficient Pi to 0.

Under condition (3-3), coeff_abs_level_greater1_flag is present for up to seven non-zero coefficients counted from the high-frequency side in the sub-block sb. For example, coeff_abs_level_greater1_flag is present if the coefficient absolute values of the first seven coefficients of 16 coefficients in the sub-block sb are each a non-zero.

For example, coefficient absolute value determining unit i may determine that coeff_abs_level_greater1_flag is present for n non-zero coefficients counted from the high-frequency side and that coeff_abs_level_greater1_flag is not present for (16-n) non-zero coefficients counted from the low-frequency side; n is greater than or equal to 7.

To assure a range in which coeff_abs_level_greater1_flag is not present, n may be 7. However, a quantization coefficient on the high-frequency side may have become 0 due to quantization. If a value greater than 7 is used as n, therefore, a value close to the amount of bin may be obtained. The value of n may be a fixed value; for example, only information about the coefficient position may be used. Alternatively, a particular parameter may be used as described below to set the value of n.

If, for example, a prediction mode (intra or inter) is used, an image closer to the original image may be created in inter prediction than in intra prediction mode. Accordingly, differential information is lessened and many 0s are highly likely to appear on the high-frequency side in the quantization result as well. In inter prediction, therefore, the value of n may be large.

If, for example, a quantization parameter is used, the strength of quantization, for example, a range in which near-zero values are handled as a zero in the quantization result, varies depending on the value of the quantization parameter. If a quantization parameter that increases the probability that many 0s appear on the high-frequency side is used, therefore, a large value of n may be allowed.

If, for example, activity is used, activity represents the degree of complexity of the area (for example, strength of a fine texture). In an area (target block) in which the value of activity is high, more high frequency components may be left. Therefore, the lower activity is, the larger the value of n may be allowed.

About (4) coeff_abs_level_greater2_flag

Coefficient absolute value determining unit i calculates the code amount r3 of coeff_abs_level_greater2_flag involved in quantization coefficient Pi according to conditions (4-1) described below. For example, coefficient absolute value determining unit i calculates the bin count corresponding to coeff_abs_level_greater2_flag involved in quantization coefficient Pi as the code amount r3.

(4-1) A coded element is present for none of quantization coefficients P1 to Pn.

In a standard in HEVC, coeff_abs_level_greater2_flag is present for quantization coefficient at the end of the high-frequency side in the sub-block sb, and has the absolute value of 2 or more. To determine whether or not the quantization coefficient is at the end of the high-frequency side in the sub-block sb, the value of other quantization coefficients in the target block B and sub-block sb is used. Therefore, a dependency relation may arise in processing among quantization coefficients.

Under condition (4-1), the presence or absence of coeff_abs_level_greater2_flag involved in a certain quantization coefficient does not depend on the value of any other quantization coefficient, so a dependency relation in processing among quantization coefficients for coeff_abs_level_greater2_flag may be removed for coeff_abs_level_greater2_flag.

Assuming that, for example, coeff_abs_level_greater2_flag involved in quantization coefficient Pi is not present, coefficient absolute value determining unit i sets the code amount r3 of coeff_abs_level_greater2_flag involved in quantization coefficient Pi to 0.

About (5) coeff_sign_flag

Coefficient absolute value determining unit i calculates the code amount r4 of coeff_sign_flag involved in quantization coefficient Pi according to conditions (5-1) described below. For example, coefficient absolute value determining unit i calculates the bin count corresponding coeff_sign_flag involved in quantization coefficient Pi as the code amount r4.

(5-1) A coded element is not present for quantization coefficients Pi with a coefficient absolute value of 0 and is present for other quantization coefficients Pi.

In a standard in HEVC, coeff_sign_flag may not be present by using technology called sign_data_hiding (coeff_sign_flag is present for other cases). Conditions that coeff_sign_flag is not present may include a condition that quantization coefficient Pi is a coefficient with a non-zero coefficient absolute value at the end of the high-frequency side in the sub-block sb. In this decision, information indicating whether or not all quantization coefficients at positions toward the high-frequency side from quantization coefficient Pi have a coefficient absolute value of zero is used. Therefore, a dependency relation may arise in processing among quantization coefficients.

Under condition (5-1), the presence or absence of coeff_sign_flag involved in a certain quantization coefficient depends only on the value of the quantization coefficient, so a dependency relation in processing among quantization coefficients may be removed for coeff_sign_flag.

If, for example, coefficient absolute value determining unit i determines that coeff_sign_flag involved in quantization coefficient Pi is present, coefficient absolute value determining unit i sets the code amount r4 of coeff_sign_flag involved in quantization coefficient Pi to 1. If coefficient absolute value determining unit i determines that coeff_sign_flag involved in quantization coefficient Pi is not present, coefficient absolute value determining unit i sets the code amount r4 of coeff_sign_flag involved in quantization coefficient Pi to 0.

About (6) coeff_abs_level_remaining

Coefficient absolute value determining unit i calculates the code amount r5 of coeff_abs_level_remaining involved in quantization coefficient Pi according to any one of conditions (6-1) and (6-2) described below. For example, coefficient absolute value determining unit i calculates the bin count corresponding to coeff_abs_level_remaining involved in quantization coefficient Pi as the code amount r5.

(6-1) A coded element is present for each of quantization coefficients P1 to Pn.

(6-2) A coded element is not present for coefficients with a coefficient absolute value of a certain non-negative integer or smaller (1 or smaller, for example) and is present for other coefficients (with a coefficient absolute value of 2 or more, for example).

In a standard in HEVC, coeff_abs_level_remaining is present for non-zero coefficients for which a value obtained by subtracting baseLevel from their coefficient values is equal to or greater than 1. baseLevel is obtained as a total of 1, coeff_abs_level_greater1_flag, and coeff_abs_level_greater2_flag. coeff_abs_level_greater1_flag and coeff_abs_level_greater2_flag may or may not be present depending on the quantization coefficient. If they are not present, their values are handled as 0. To make it certain that coeff_abs_level_greater1_flag and coeff_abs_level_greater2_flag are present, information about the values of other quantization coefficients in the sub-block sb may be used. Therefore, a dependency relation may arise in processing among quantization coefficients.

Under conditions (6-1) and (6-2), the presence or absence of coeff_abs_level_remaining of a certain quantization coefficient does not depend on the value of any other quantization coefficient, so a dependency relation in processing among quantization coefficients may be removed for coeff_abs_level_remaining.

If coeff_abs_level_remaining is present, the value of the nearest non-zero coefficient (cLastAbsLevel) on the high-frequency side in the sub-block sb is used to binarize coeff_abs_level_remaining. cLastRiceParam is calculated during binarization of cLastAbsLevel. Therefore, a dependency relation may arise in processing among quantization coefficients in the sub-block sb.

If coeff_abs_level_remaining involved in quantization coefficient Pi is present, coefficient absolute value determining unit i may set the cord amount r5 of coeff_abs_level_remaining involved in quantization coefficient Pi as described (i) or (ii) below. If coeff_abs_level_remaining involved in quantization coefficient Pi is not present, coefficient absolute value determining unit i sets the code amount r5 of coeff_abs_level_remaining involved in quantization coefficient Pi to 0.

(i) Any Golomb coding is applied to a value obtained by subtracting a certain non-negative integer from the coefficient absolute value of quantization coefficient Pi to perform coding. A parameter for Golomb coding may be determined depending only on the coefficient absolute value of quantization coefficient Pi, its coefficient position, or a particular parameter.

For example, coefficient absolute value determining unit i applies binarization in which cLastAbsLevel is set to 0 and cLastRiceParam is set to 0 to a value obtained by subtracting 2 from the coefficient absolute value of quantization coefficient Pi. In this case, the values of cLastAbsLevel and cLastRiceParam may be determined without depending on the value of the nearest non-zero coefficient on the high-frequency side in the sub-block sb.

(ii) Coding similar to Golomb coding is applied to a value obtained by subtracting a certain non-negative integer from the coefficient absolute value of quantization coefficient Pi.

For example, coefficient absolute value determining unit i may apply $\gamma$ coding to a value obtained by subtracting 2 from the coefficient absolute value of quantization coefficient Pi and may set the subtraction result as the binarization result. In this case, binarization may be performed without depending on the value of the nearest non-zero coefficient on the high-frequency side in the sub-block sb.

Coefficient absolute value determining unit i add the code amounts r1 to r5 of relevant coded elements to calculate the code amount Rk generated when the target block B has been coded on the assumption that the coefficient absolute value of quantization coefficient Pi is coefficient absolute value candidate AVCk.

This is also true for calculation of the code amount R[i] generated when the target block B has been coded on the assumption that the coefficient absolute value of quantization coefficient Pi is at the last coefficient position.

FIG. 6 illustrates an example of a quantization processing procedure. The quantization processing procedure in FIG. 6 may be executed by the quantization apparatus 100. In FIG. 6, the quantization apparatus 100 declares coefficient absolute value array Abs[n] (operation S601). Coefficient absolute value array Abs[n] stores coefficient absolute values determined in coefficient absolute value determination processing on individual quantization coefficients Pi. When the coefficient is at the end of the low-frequency side, idx is 1. When the coefficient is at the end of the high-frequency side, idx is n.

The quantization apparatus 100 concurrently performs a plurality of pieces of scaling processing on individual quantization coefficients Pi in the target block B (operation S602). The quantization apparatus 100 concurrently performs a plurality of pieces of coefficient absolute value determination processing on individual quantization coefficients Pi (operation S603). An argument in coefficient absolute value determination processing on quantization coefficient Pi is quantization coefficient Pi.

The quantization apparatus 100 performs last coefficient position determination processing on the target block B (operation S604), terminating a series of processing. Concurrent execution of scaling processing in operation S602 and the coefficient absolute value determination processing in operation S603 may be achieved by, for example, a single instruction multiple data (SIMD) instruction or general-purpose computing on graphics processing units (GPGPU).

FIG. 7 illustrates an example of coefficient absolute value determination processing performed on quantization coefficient Pi. In FIG. 7, the quantization apparatus 100 performs RD cost calculation processing in which RD cost J1 is calculated in a case in which quantization coefficient Pi is coefficient absolute value candidate AVC1 (operation S701).

Coefficient absolute value candidate AVC1 is a value obtained by quantizing the scaling result of transform coefficient Ci and rounding up the fractional part of the quantization result. Arguments in RD cost calculation processing are coefficient absolute value candidate AVCk of quantization coefficient Pi and a coefficient index. The coefficient index may be information indicating quantization coefficient Pi to be processed in the sub-block sb.

The quantization apparatus 100 performs RD cost calculation processing in which RD cost J2 is calculated in a case in which quantization coefficient Pi is coefficient absolute value candidate AVC2 (operation S702). Coefficient absolute value candidate AVC2 is a value obtained by quantizing the scaling result of transform coefficient Ci and truncating the fractional part of the quantization result.

The quantization apparatus 100 performs RD cost calculation processing in which RD cost J3 is calculated in a case in which quantization coefficient Pi is coefficient absolute value candidate AVC3 (operation S703). Coefficient absolute value candidate AVC3 is a value obtained by quantizing the scaling result of transform coefficient Ci and setting the quantization result to 0.

The quantization apparatus 100 selects the least RD cost J from calculated RD costs J1 to J3 (operation S704). The quantization apparatus 100 determines coefficient absolute value candidate AVCk of quantization coefficient Pi corresponding to the selected least RD cost J to be the coefficient absolute value of quantization coefficient Pi (operation S705).

The quantization apparatus 100 stores the determined coefficient absolute value of quantization coefficient Pi in coefficient absolute value array Abs[n] (operation S706). The sequence then returns to the operation in which coefficient absolute value determination processing on quantization coefficient Pi has been called.

Figure 8:
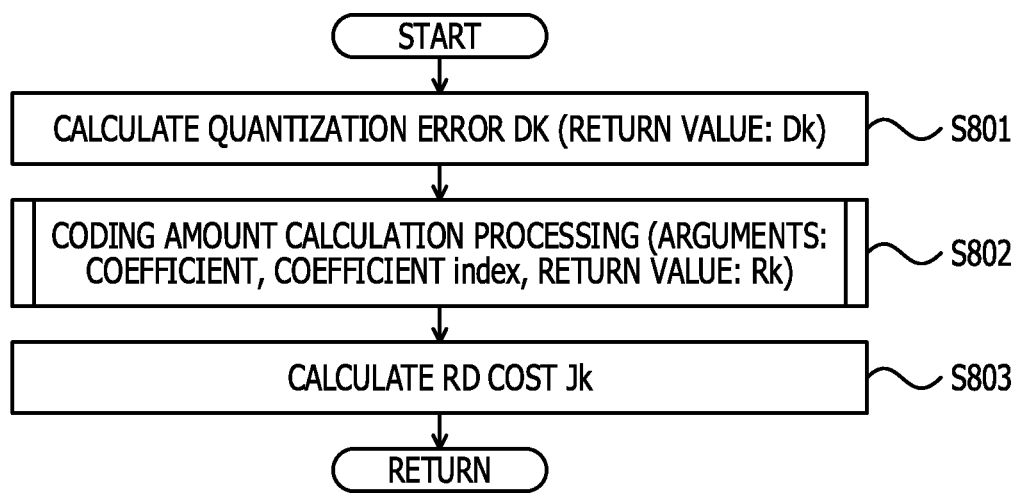
FIG. 8 illustrates an example of a RD cost calculation processing.

FIG. 8 illustrates an example of RD cost calculation processing. In FIG. 8, the quantization apparatus 100 calculates quantization error Dk in a case in which the target block B has been coded by using the coefficient absolute value of quantization coefficient Pi as coefficient absolute value candidate AVCk (operation S801). Quantization error Dk may be, for example, the sum of square error between a decoded pixel value and an input pixel value.

The quantization apparatus 100 performs coding amount calculation processing in which the amount of coding Rk is calculated in a case in which the target block B has been coded by using the coefficient absolute value of quantization coefficient Pi as coefficient absolute value candidate AVCk (operation S802).

By assigning quantization error Dk and the code amount Rk to equation (1) above, the quantization apparatus 100 calculates RD cost Jk for one frequency component in the target block B in a case in which the coefficient absolute value of quantization coefficient Pi is used as coefficient absolute value candidate AVCk (operation S803). The sequence then returns to the operation in which RD cost calculation processing has been called.

Figure 9:
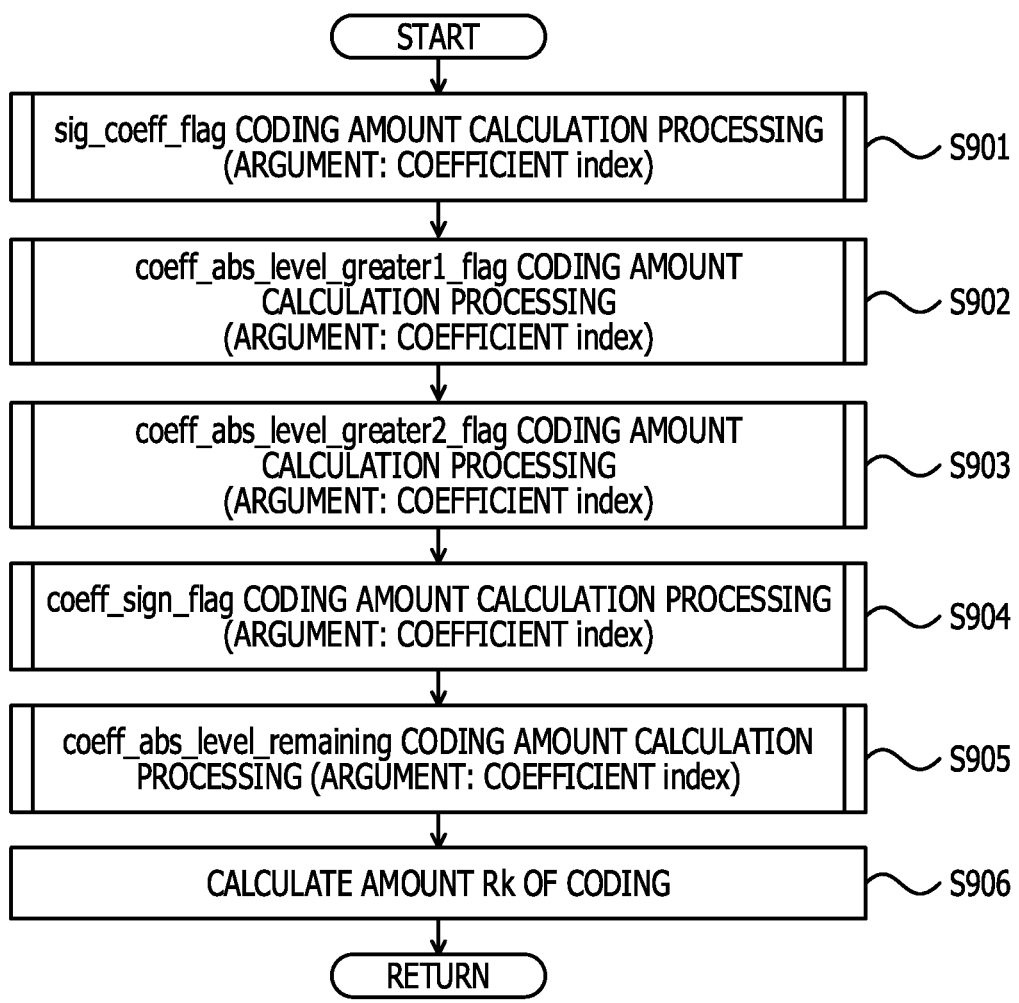
FIG. 9 illustrates an example of a coding amount calculation processing.

FIG. 9 illustrates an example of coding amount calculation processing. In FIG. 9, the quantization apparatus 100 performs sig_coeff_flag coding amount calculation processing in which the code amount r1 of sig_coeff_flag is calculated (operation S901).

The quantization apparatus 100 performs coeff_abs_level_greater1_flag coding amount calculation processing in which the code amount r2 of coeff_abs_level_greater1_flag is calculated (operation S902).

The quantization apparatus 100 performs coeff_abs_level_greater2_flag coding amount calculation processing in which the code amount r3 of coeff_abs_level_greater2_flag is calculated (operation S903).

The quantization apparatus 100 performs coeff_sign_flag coding amount calculation processing in which the code amount r4 of coeff_sign_flag is calculated (operation S904).

The quantization apparatus 100 performs coeff_abs_level_remaining coding amount calculation processing in which the code amount r5 of coeff_abs_level_remaining is calculated (operation S905).

By adding the calculated amounts r1 to r5, the quantization apparatus 100 calculates the code amount Rk in a case in which the target block B has been coded by using the coefficient absolute value of quantization coefficient Pi as coefficient absolute value candidate AVCk (operation S906). The sequence then returns to the operation in which coding amount calculation processing has been called.

Figure 10:
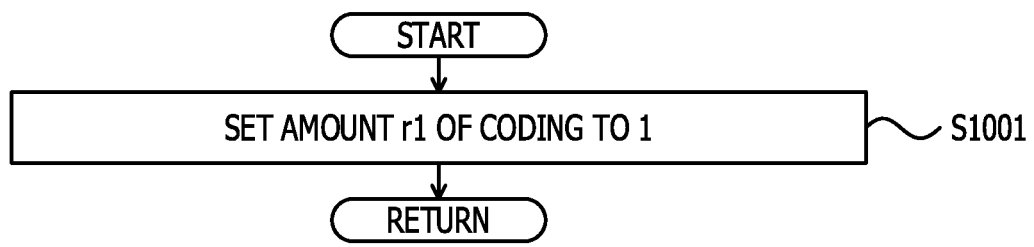
FIG. 10 illustrates an example of a sig_coeff_flag coding amount calculation processing.

FIG. 10 illustrates an example of sig_coeff_flag coding amount calculation processing. In FIG. 10, the quantization apparatus 100 sets the code amount r1 of sig_coeff_flag to 1 (operation S1001). The sequence then returns to the operation in which sig_coeff_flag coding amount calculation processing has been called.

Even if the values of Abs[n] to Abs[i+1] have not been determined, the code amount r1 of sig_coeff_flag involved in quantization coefficient Pi may be calculated.

Figure 11:
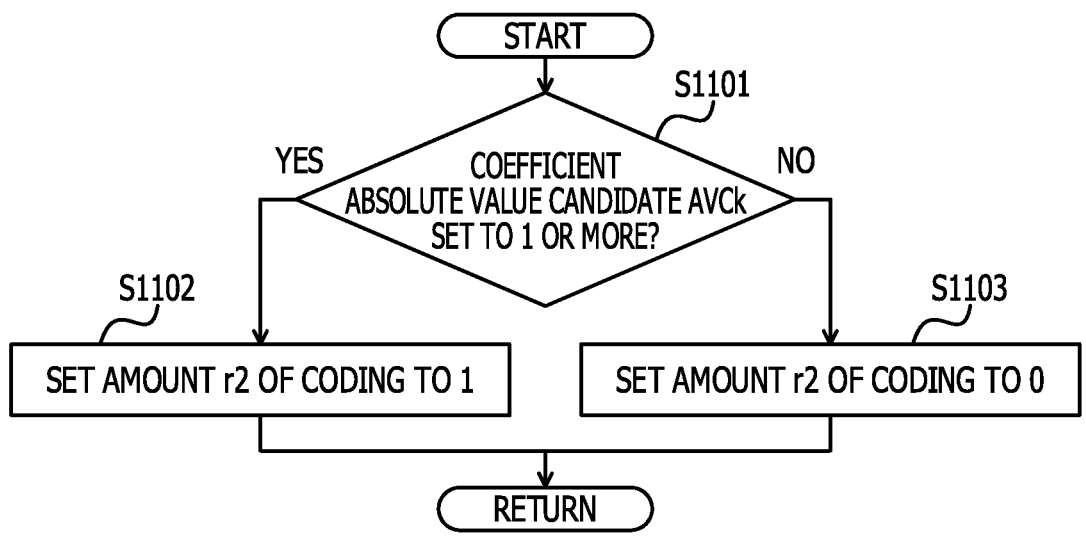
FIG. 11 illustrates an example of a coeff_abs_level_greater1_flag coding amount calculation processing.

FIG. 11 illustrates an example of coeff_abs_level_greater1_flag coding amount calculation processing. In FIG. 11, the quantization apparatus 100 determines whether or not coefficient absolute value candidate AVCk of quantization coefficient Pi is 1 or more (operation S1101).

If coefficient absolute value candidate AVCk of quantization coefficient Pi is 1 or more (the result in operation S1101 is Yes), the quantization apparatus 100 sets the code amount r2 of coeff_abs_level_greater1_flag to 1 (operation S1102). The sequence then returns to the operation in which coeff_abs_level_greater1_flag coding amount calculation processing has been called.

If coefficient absolute value candidate AVCk of quantization coefficient Pi is smaller than 1 (the result in operation S1101 is No), the quantization apparatus 100 sets the code amount r2 of coeff_abs_level_greater1_flag to 0 (operation S1103). The sequence then returns to the operation in which coeff_abs_level_greater1_flag coding amount calculation processing has been called.

Even if the values of Abs[n] to Abs[i+1] have not been determined, the code amount r2 of coeff_abs_level_greater1_flag involved in quantization coefficient Pi may be calculated.

Figure 12:
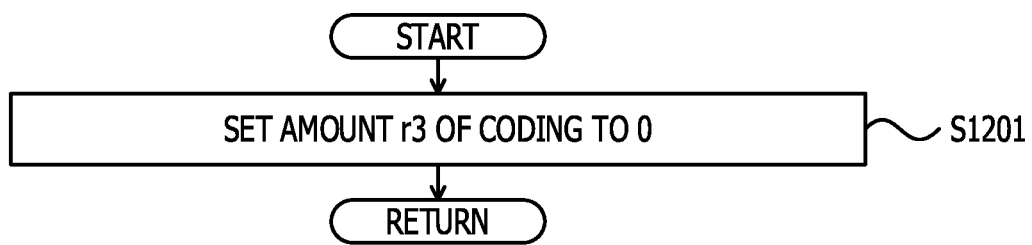
FIG. 12 illustrates an example of a coeff_abs_level_greater2_flag coding amount calculation processing.

FIG. 12 illustrates an example of coeff_abs_level_greater2_flag coding amount calculation processing. In FIG. 12, the quantization apparatus 100 sets the code amount r3 of coeff_abs_level_greater2_flag to 0 (operation S1201). The sequence then returns to the operation in which coeff_abs_level_greater2_flag coding amount calculation processing has been called Even if the values of Abs[n] to Abs[i+1] have not been determined, the code amount r3 of coeff_abs_level_greater2_flag involved in quantization coefficient Pi may be calculated.

Figure 13:
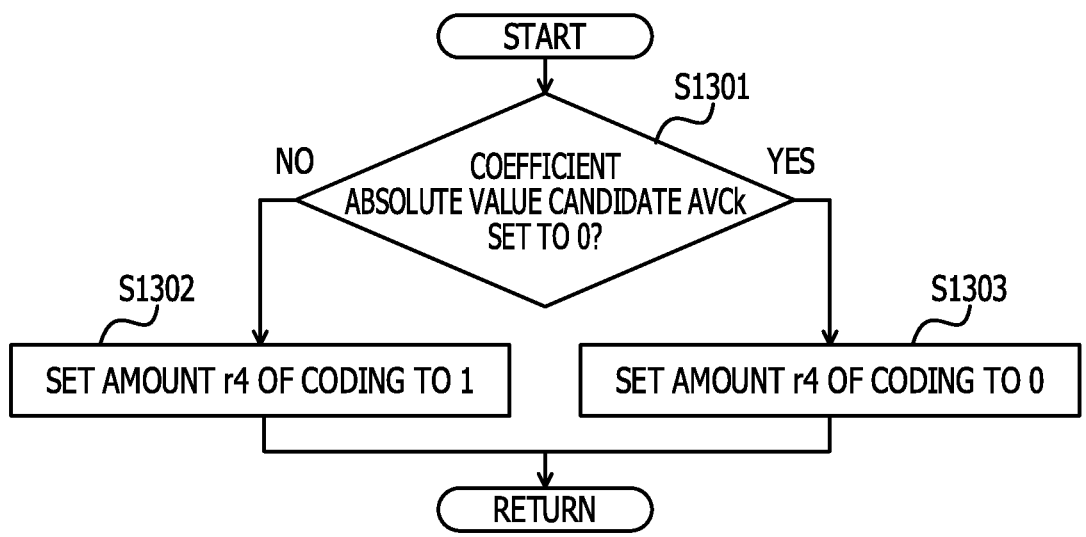
FIG. 13 illustrates an example of a coeff_sign_flag coding amount calculation processing.

FIG. 13 illustrates an example of coeff_sign_flag coding amount calculation processing. In FIG. 13, the quantization apparatus 100 determines whether or not coefficient absolute value candidate AVCk of quantization coefficient Pi is 0 (operation S1301).

If coefficient absolute value candidate AVCk of quantization coefficient Pi is not 0 (the result in operation S1301 is No), the quantization apparatus 100 sets the code amount r4 of coeff_sign_flag to 1 (operation S1302). The sequence then returns to the operation in which coeff_sign_flag coding amount calculation processing has been called.

If coefficient absolute value candidate AVCk of quantization coefficient Pi is 0 (the result in operation S1301 is Yes), the quantization apparatus 100 sets the code amount r4 of coeff_sign_flag to 0 (operation S1303). The sequence then returns to the operation in which coeff_sign_flag coding amount calculation processing has been called.

Even if the values of Abs[n] to Abs[i+1] have not been determined, the code amount r4 of coeff_sign_flag involved in quantization coefficient Pi may be calculated.

FIG. 14 illustrates an example of coeff_abs_level_remaining coding amount calculation processing. In FIG. 14, the quantization apparatus 100 sets cLastAbsLevel to 0 and cLastRiceParam to 0 (operation S1401).

The quantization apparatus 100 sets cAbsLevel to the sum of baseLevel and coeff_abs_level_remaining (operation S1402). baseLevel is an intermediate variable. The quantization apparatus 100 sets cRiceParam so that it becomes equal to Min (cLastRiceParam+(cLastAbsLevel>(3×(1<<cLastRiceParam))?1:0), 4) (operation S1403).

The quantization apparatus 100 sets cMax so that it becomes equal to 4<<cRiceParam (operation S1404) and also sets prefixVal to Min (cMax, coeff_abs_level_remaining) (operation S1405). The quantization apparatus 100 performs TR binarization processing as prefix part bin calculation processing (operation S1406). The target to be processed is prefixVal and parameters are cMax and cRiceParam.

The quantization apparatus 100 determines whether or not the prefix part bin calculation processing result is 1111 (operation S1407). If the prefix part bin calculation processing result is 1111 (the result in operation S1407 is Yes), the quantization apparatus 100 sets suffixVal to a value obtained by subtracting cMax from coeff_abs_level_remaining (operation S1408).

The quantization apparatus 100 performs EGk binarization as prefix part bin calculation processing (operation S1409). The target to be subject to binarization processing is suffixVal and a parameter is cRiceParam+1.

The quantization apparatus 100 sets the code amount r5 of coeff_abs_level_remaining to a value obtained by bit-concatenating the prefix part bin calculation processing result and the suffix part bin calculation processing result (operation S1410). The sequence then returns to the operation in which coeff_abs_level_remaining coding amount calculation processing has been called.

If the prefix part bin calculation processing result is not 1111 in operation S1407 (the result in operation S1407 is No), the quantization apparatus 100 sets the code amount r5 of coeff_abs_level_remaining to the prefix part bin calculation processing result (operation S1411). The sequence then returns to the operation in which coeff_abs_level_remaining coding amount calculation processing has been called.

Even if the values of Abs[n] to Abs[i+1] have not been determined, the code amount r5 of coeff_abs_level_remaining involved in quantization coefficient Pi may be calculated.

In FIG. 6, a concurrence degree on which coefficient absolute value determination processing of quantization coefficients Pi is concurrently performed, may be substantially the same as the number of quantization coefficients P1 to Pn in the target block B. For example, the concurrence degree may be smaller than the number of quantization coefficients P1 to Pn in the target block B so that the quantization apparatus 100 performs partially concurrent processing.

Figure 15:
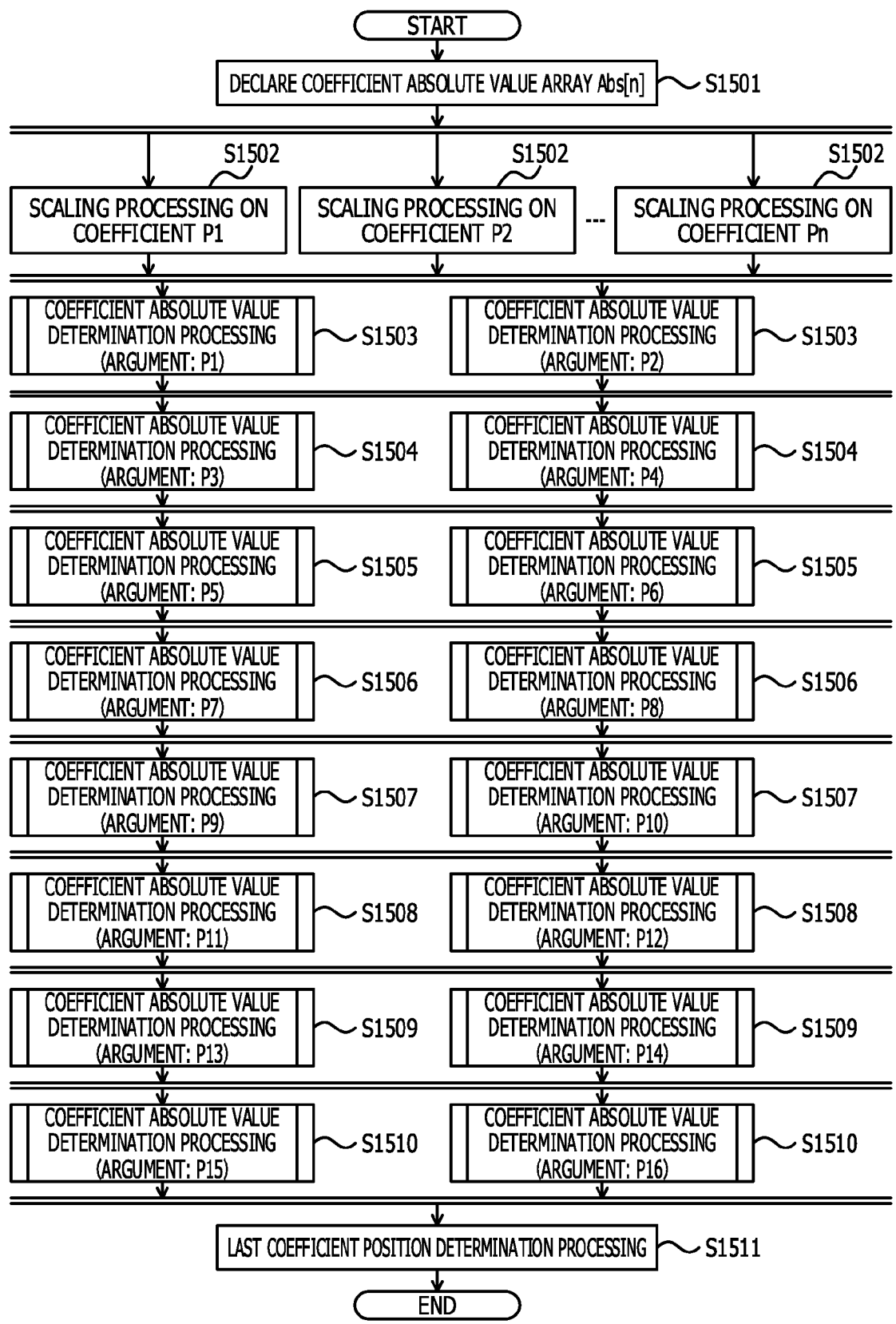
FIG. 15 illustrates an example of a quantization processing procedure.

FIG. 15 illustrates an example of a quantization processing procedure. The quantization processing procedure in FIG. 15 may be executed by the quantization apparatus 100. In FIG. 15, the quantization apparatus 100 declares coefficient absolute value array Abs[n] (operation S1501). The target block B may be four pixels×four pixels in size. The value of n may be 16.

The quantization apparatus 100 concurrently performs scaling processing on quantization coefficients P1 to P16 in the target block B (operation S1502). The quantization apparatus 100 concurrently performs coefficient absolute value determination processing on quantization coefficients P1 and P2 (operation S1503). The quantization apparatus 100 concurrently performs coefficient absolute value determination processing on quantization coefficients P3 and P4 (operation S1504).

The quantization apparatus 100 concurrently performs coefficient absolute value determination processing on quantization coefficients P5 and P6 (operation S1505). The quantization apparatus 100 concurrently performs coefficient absolute value determination processing on quantization coefficients P7 and P8 (operation S1506).

The quantization apparatus 100 concurrently performs coefficient absolute value determination processing on quantization coefficients P9 and P10 (operation S1507). The quantization apparatus 100 concurrently performs coefficient absolute value determination processing on quantization coefficients P11 and P12 (operation S1508).

The quantization apparatus 100 concurrently performs coefficient absolute value determination processing on quantization coefficients P13 and P14 (operation S1509). The quantization apparatus 100 concurrently performs coefficient absolute value determination processing on quantization coefficients P15 and P16 (operation S1510). The quantization apparatus 100 performs last coefficient position determination processing on the target block B (operation S1511), terminating a series of processing.

Coefficient absolute value determination processing on each of quantization coefficients P1 to P16 may be concurrently performed on two quantization coefficients. For example, in the last processing (operation S1510) in the repetition of coefficient absolute value determination processing on quantization coefficients P1 and P16, the coefficient absolute values of other quantization coefficients have been determined, so the presence or absence of coeff_abs_level_greater1_flag may be determined according to the values of quantization coefficients with a coefficient absolute value of 2 or more that have appeared in the sub-block sb. cLastAbsLevel and cLastRiceParam may be determined according to the coefficient absolute value of a coefficient that has appeared in the sub-block sb before coeff_abs_level_remaining is calculated or to cRiceParam obtained in the binarization of the coefficient absolute value.

Figure 16:
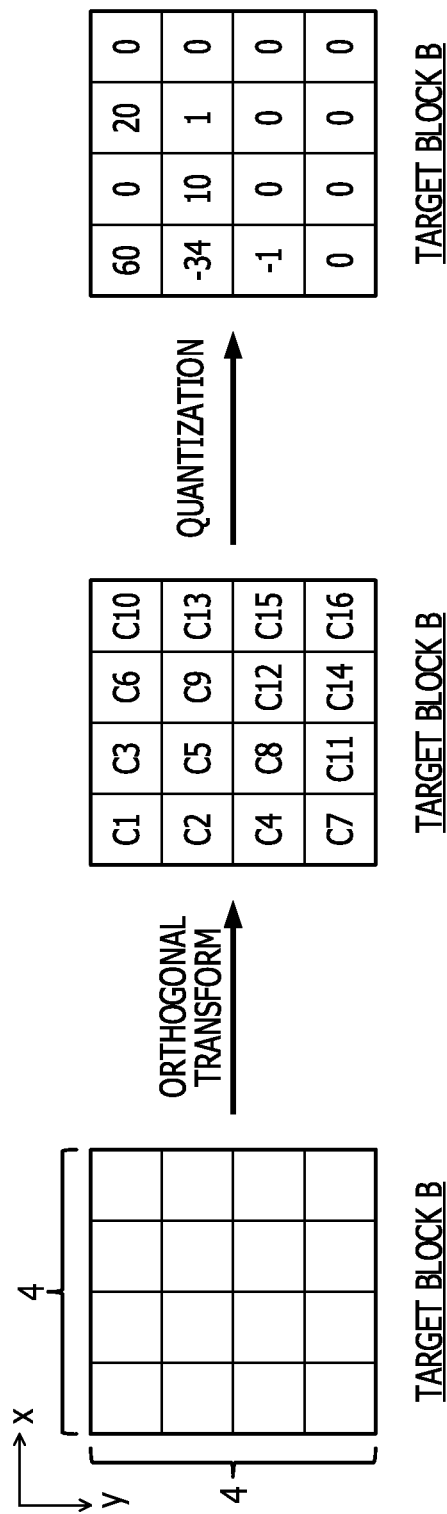
FIG. 16 illustrates an example of quantization coefficients P1 to Pn in a target block.

FIG. 16 illustrates an example of quantization coefficients P1 to Pn in a target block. The target block B in FIG. 16 may be a block to be processed that has a size of four pixels×four pixel. In FIG. 16, the coefficient absolute values of quantization coefficients P1 to P16, which have been obtained by quantizing the scaling results of transform coefficients C1 to C16 in the target block B, are indicated in a two-dimensional array.

The quantization coefficient list L of the target block B may be, for example, [60, −34, 0, −1, 10, 20, 0, 0, 1, 0, 0, 0, 0, 0, 0, 0]. For example, the code amount R[9] is indicated in a case in which the target block B has been coded, assuming that quantization coefficient P9 is at the last coefficient position in the quantization coefficient list L.

sig_coeff_flag may be present for all quantization coefficients P1 to P16 (condition (2-1) above). For coeff_abs_level_greater1_flag, the coefficient absolute value may not be 0; for example, coeff_abs_level_greater1_flag may be present for all quantization coefficients P1 to P16 with a coefficient absolute value of 1 or more (condition (3-1) above). coeff_abs_level_greater2_flag may not be present for all quantization coefficients P1 to P16 (condition (4-1) above).

coeff_sign_flag may not be present for quantization coefficients with a coefficient absolute value of 0 and may be present for other quantization coefficients (condition (5-1) above). coeff_abs_level_remaining may not be present for quantization coefficients with a coefficient absolute value of 2 or more (condition (6-2) above). If coeff_abs_level_remaining is present, cLastAbsLevel may be 0 and cLastRiceParam may be 0.

transform_skip_enabled_flag of a picture parameter set (PPS) may be 0, and sign_data_hiding_enabled_flag of the PPS may be 0. The PPS may be a set of parameters that are enough if they are switched on a per-picture basis. The PPS may be, for example, a set of parameters that are such that although coding efficiency is not so increased if parameters are switched in a per-slice basis, but coding efficiency is increased if parameters are switched in a per-picture basis.

transform_skip_enabled_flag is a selection flag that selects whether to include transform_skip_flag in residual_coding. When a screen on a personal computer is transmitted through a network (this operation will be referred to below as a screen transfer), if orthogonal transform processing is not performed, an image may be more efficiently compressed. For this reason, in HEVC, whether to perform an orthogonal transform is selected for each target block B. This selection may be made by transform_skip_flag in residual_coding.

If transform_skip_flag is transmitted, a bit stream becomes larger than in a case in which it is not transmitted. In a screen transmission, even if an increase in the bit stream is considered, an effect in bit stream reduction that is brought by a selection as to whether to perform an orthogonal transform is large, so the bit stream may be reduced as a whole.

For a natural image (an image taken by a camcorder, for example), compression efficient remains almost the same regardless of whether or not execution of an orthogonal transform is selected. If, therefore, transform_skip_flag is transmitted, a bit stream may become large in most cases. In HEVC, whether to include transform_skip_flag in residual_coding may be selected according to the property of an image to be coded.

sign_data_hiding_enabled_flag is a flag that indicates whether to use a sign_data_hiding function. In sign_data_hiding, if a certain condition is met, the sign (coeff_sign_flag) of one non-zero coefficient in the sub-block sb is determined depending on whether the sum of other coefficient absolute values in the sub-block sb is an even value or an odd value. If the value of sign_data_hiding_enabled_flag is 1 and a particular condition is met, sign_data_hiding is performed in the sub-block sb.

About (0) transform_skip_flag

Since transform_skip_enabled_flag is set to 0, no coded element appears.

About (1) last_sig_coeff_x_prefix, last_sig_coeff_y_prefix, last_sig_coeff_x_suffix, and last_sig_coeff_y_suffix The target block B before reverse scanning may be a two-dimensional array as illustrated in FIG. 16. The last coefficient position after scanning may be represented as two variables (indexes in a two-dimensional array), last_sig_coeff_x and last_sig_coeff_y. In FIG. 16, last_sig_coeff_x is set to 2 and last_sig_coeff_y is set to 1.

last_sig_coeff_x_prefix is set to 2 and last_sig_coeff_y_prefix is set to 1. They are binarized in TR binarization by using cMax that is set to 3 and cRiceParam that is set to 0 as the parameters. The binarization results of last_sig_coeff_x_prefix and last_sig_coeff_y_prefix may be respectively 110 and 10. Since both last_sig_coeff_x_prefix and last_sig_coeff_y_prefix are 3 or smaller, last_sig_coeff_x_prefix and last_sig_coeff_y_prefix are not present.

If the two variables, last_sig_coeff_x and last_sig_coeff_y, are separated into two parts (prefix and suffix) and different binarization methods are applied to them as in Rice coding, coding efficiency is higher than in a case in which a binarization method of some kind is applied to these two variables without separation. In the syntax element, therefore, the two variables are separated into two parts.

About (1.5) coded_sub_block_flag

Since the target block B is four pixels×four pixels in size, a coded element does not appear.

About (2) sig_coeff_flag

Since sig_coeff_flag is set so that it is present for all coefficients in the target block B, the syntax element value of sig_coeff_flag may be 0, 0, 0, 0, 0, 0, 0, 1, 0, 0, 1, 1, 1, 0, 1, 1. FL binarization is performed on each bit in the syntax element value. As a result, the bin string becomes 0000000100111011.

About (3) coeff_abs_level_greater1_flag

Since coeff_abs_level_greater1_flag is set so that it is present for quantization coefficients with a non-zero coefficient absolute value, coeff_abs_level_greater1_flag present for 1, −1, 10, 20, −34, 60 in the quantization coefficient list L is set, so the syntax element value becomes 0, 0, 1, 1, 1, 1. FL binarization is performed on each bit of the syntax element value. As a result, the bin string becomes 001111.

About (4) coeff_abs_level_greater2_flag

Since coeff_abs_level_greater2_flag is set so that it is present for none of all quantization coefficients P1 to P16, neither a syntax element nor a bin is present.

About (5) coeff_sign_flag

Since sign_data_hiding_enabled_flag is set to 0, the sings of all non-zero coefficients are listed; the sing string becomes+, −, +, +, −, +. When the sign is a plus sign, 0 is set. When the sign is a minus sign, 1 is set. Therefore, the syntax element value becomes 0, 1, 0, 0, 1, 0. FL binarization is performed on each bit of the syntax element value. As a result, the bin string becomes 010010.

About (6) coeff_abs_level_remaining

Since coeff_abs_level_remaining is set so that it is present for quantization coefficients with a coefficient absolute value of 2 or more, if these quantization coefficients are listed starting from the high-frequency side, their list becomes 10, 20, −34, 60. coeff_abs_level_remaining for these quantization coefficients becomes 7, 18, 32, 58. The binarization process for coeff_abs_level_remaining in FIG. 14 may be performed on the syntax element.

For example, binarization (with baseLevel set to 2) on 10 is as follows.
1. cLastAbsLevel=0, cLastRiceParam=0
2. cAbsLevel=10
3. cRiceParam=0
4. cMax=4
5. prefixVal=4
6. Result of bin string calculation processing on the prefix part: 1111
7. Since the bin string in the prefix part is 1111, a suffix is present and the suffix part is 1011.

Binarization (with baseLevel set to 2) on 20 is as follows.
1. cLastAbsLevel=0, cLastRiceParam=0
2. cAbsLevel=20
3. cRiceParam=0
4. cMax=4
5. prefixVal=4
6. Result of bin string calculation processing on the prefix part: 1111
7. Since the bin string in the prefix part is 1111, a suffix is present and the suffix part is 11100000.

Binarization (with baseLevel set to 2) on −34 is as follows.
1. cLastAbsLevel=0, cLastRiceParam=0
2. cAbsLevel=34
3. cRiceParam=0
4. cMax=4
5. prefixVal=4
6. Result of bin string calculation processing on the prefix part: 1111
7. Since the bin string in the prefix part is 1111, a suffix is present and the suffix part is 11101110.

Binarization (with baseLevel set to 2) on 60 is as follows.
1. cLastAbsLevel=0, cLastRiceParam=0
2. cAbsLevel=60
3. cRiceParam=0
4. cMax=4
5. prefixVal=4
6. Result of bin string calculation processing on the prefix part: 1111
7. Since the bin string in the prefix part is 1111, a suffix is present and the suffix part is 1111011000.

As a result, the code amount R[9] performed in case in which the target block B has been coded on the assumption that quantization coefficient P9 is at the last coefficient position becomes the total number of bins corresponding to each of coded elements.

Figure 17:
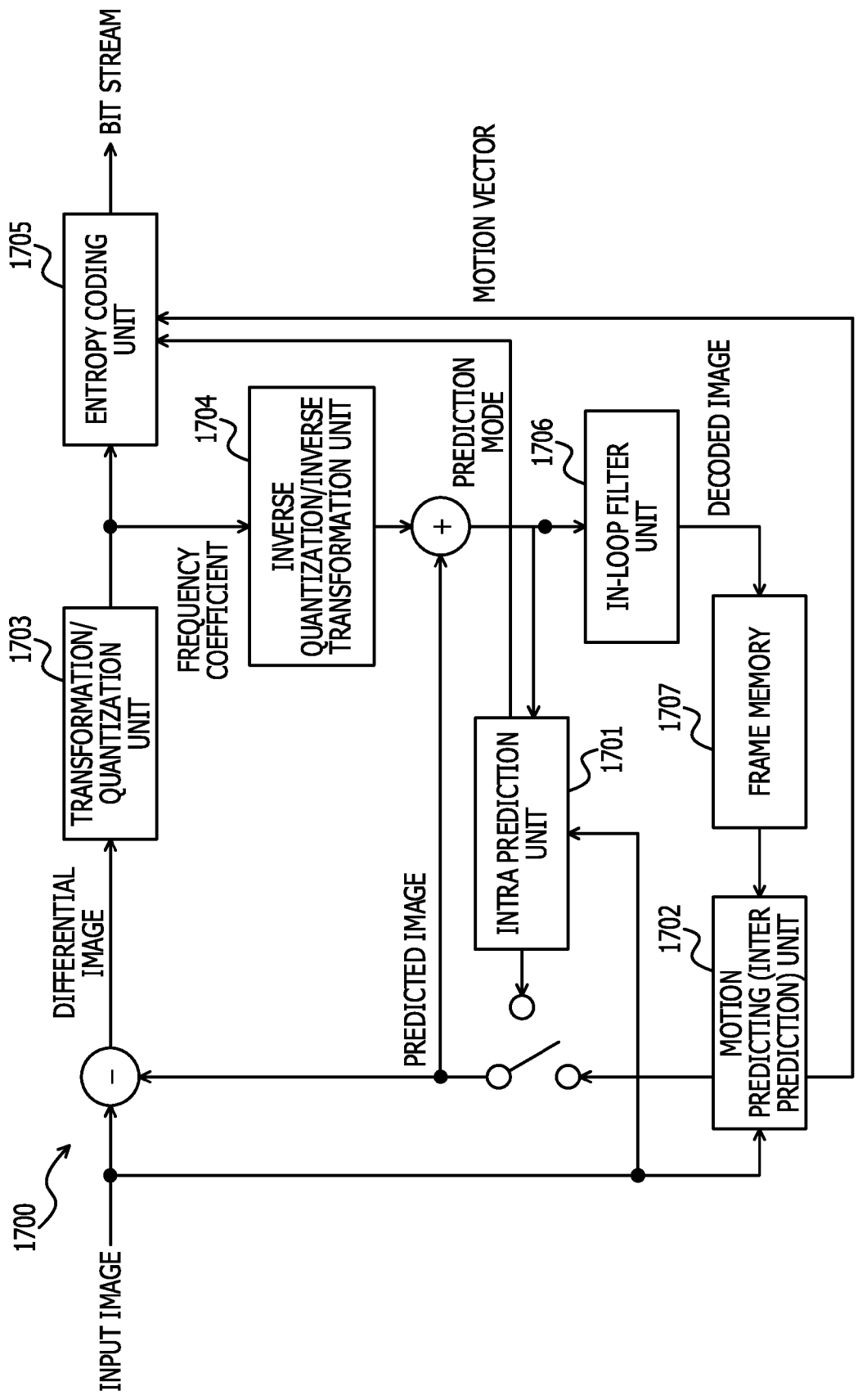
FIG. 17 illustrates an example of a coding apparatus.

FIG. 17 illustrates an example of a coding apparatus. The coding apparatus 1700 in FIG. 17 includes an intra prediction unit 1701, a motion prediction (inter prediction) unit 1702, a transformation/quantization unit 1703, an inverse quantization/inverse transformation unit 1704, an entropy coding unit 1705, an in-loop filter unit 1706, and a frame memory 1707.

The intra prediction unit 1701 performs intra prediction processing in which a predictive image is created by using spatially adjacent pixels in the same frame. The motion prediction unit 1702 performs inter prediction in which a motion is detected and a predictive image is created by using a locally decoded image in a coded frame stored in the frame memory 1707.

The transformation/quantization unit 1703 performs transformation and quantization on a differential image (predictive residual signals) between an input image and a predictive image. The quantization apparatus 100 may be applied to a portion, in the transformation/quantization unit 1703, that performs quantization. The inverse quantization/ inverse transformation unit 1704 performs inverse quantization and inverse transformation on a quantized coefficient.

The entropy coding unit 1705 performs entropy coding on a quantized coefficient. The in-loop filter unit 1706 performs filter processing on a locally decoded image before filtering. The frame memory 1707 stores a decoded image (locally decoded image) output from the in-loop filter unit 1706.

In the coding apparatus 1700, a plurality of pieces of RD cost J calculation operation processing in RDOQ processing may be concurrently performed, so processing performance in the entire coding processing to code a moving picture may be improved.

In RD cost J calculation in RDOQ processing, the quantization apparatus 100 may obtain the code amount r of a coded element involved in quantization coefficient Pi in the target block B without depending on the values of other quantization coefficients in the target block B. The quantization apparatus 100 may obtain the code amount r of a coded element from its corresponding bin count before arithmetic coding.

Therefore, a plurality of pieces of RD cost Jk calculation operation processing, which is used to determine the coefficient absolute values of each of quantization coefficients P1 to Pn in the target block B, may be concurrently performed, so processing performance in quantization processing in which RDOQ processing is performed may be improved. Part of a plurality of pieces of RD cost J[i] calculation operation processing used to determine the last coefficient position of the target block B may be concurrently performed.

The quantization apparatus 100 may calculate the code amount r1 of sig_coeff_flag involved in quantization coefficient Pi according to any one of conditions (2-1), (2-2), and (2-3) above. Under conditions (2-1) and (2-2), the presence or absence of sig_coeff_flag involved in quantization coefficient Pi does not depend on the value of any other quantization coefficient, so a dependency relation in processing among quantization coefficients may be removed for sig_coeff_flag.

For example, the quantization apparatus 100 may calculate the code amount r2 of coeff_abs_level_greater1_flag involved in quantization coefficient Pi according to any one of conditions (3-1), (3-2), and (3-3) above. Under conditions (3-1) and (3-2), the presence or absence of coeff_abs_level_greater1_flag involved in quantization coefficient Pi depends on the value (coefficient absolute value candidate AVCk) of quantization coefficient Pi, so a dependency relation in processing among quantization coefficients may be removed for coeff_abs_level_greater1_flag. The presence or absence of coeff_abs_level_greater1_flag involved in quantization coefficient Pi may depend only on the value (coefficient absolute value candidate AVCk).

For example, the quantization apparatus 100 may calculate the code amount r3 of coeff_abs_level_greater2_flag involved in quantization coefficient Pi according to condition (4-1) above. Under condition (4-1), the presence or absence of coeff_abs_level_greater2_flag involved in quantization coefficient Pi does not depend on the value of any other quantization coefficient, so a dependency relation in processing among quantization coefficients may be removed for coeff_abs_level_greater2_flag.

For example, the quantization apparatus 100 may calculate the code amount r4 of coeff_sign_flag involved in quantization coefficient Pi according to condition (5-1) above. Under condition (5-1), the presence or absence of coeff_sign_flag involved in quantization coefficient Pi depends on the value of quantization coefficient Pi, so a dependency relation in processing among quantization coefficients may be removed for coeff_sign_flag. The presence or absence of coeff_sign_flag involved in quantization coefficient Pi may depend only on the value of quantization coefficient Pi.

For example, the quantization apparatus 100 may calculate the code amount r5 of coeff_abs_level_remaining involved in quantization coefficient Pi according to any one of conditions (6-1) and (6-2) above. Under conditions (6-1) and (6-2), the presence or absence of coeff_abs_level_remaining involved in quantization coefficient Pi does not depend on the value of any other quantization coefficient, so a dependency relation in processing among quantization coefficients may be removed for coeff_abs_level_remaining.

A quantization method may be executed by causing a personal computer, a workstation, or another type of computer to execute a quantization program prepared in advance. The quantization program may be executed by being recorded on a computer-readable recording medium such as a hard disk, a flexible disk, a compact disc-read-only memory (CD-ROM), a magneto-optic (MO) disk, a digital versatile disk (DVD) or the like and then read from the recording medium. The quantization program may be distributed through the Internet or another network.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A quantization method comprising:
performing, by a computer, scaling on transform coefficients of a target block of a moving picture in a compression coding processing;
quantizing scaled transform coefficients to obtain a plurality of quantization coefficients; and
performing, in parallel, calculations for the respective quantization coefficients to obtain respective coefficient absolute values in a rate distortion optimized quantization operation, each of the calculations in which:
a second code amount of a coded element for each of a plurality of coefficient absolute value candidates of the respective quantization coefficients is obtained by binarizing the coded element under one of a first condition and a second condition, the first condition indicating a presence of the coded element, the second condition for selecting the presence of the coded element according to at least one of the plurality of coefficient absolute value candidates, a coefficient position, and a parameter, wherein the parameter is at least one of a picture type, information indicating a picture to be coded in a reference structure, a prediction mode, a quantization parameter, and a scaling list;
a first code amount of the target block for each of the plurality of coefficient absolute value candidates is calculated based on the second code amount of the coded element;
a cost of coding the target block for each of the plurality of coefficient absolute value candidates is calculated based on the first code amount of the target block and a quantization error; and
a coefficient absolute value candidate having a least cost is selected as a coefficient absolute value from among the plurality of coefficient absolute value candidates.

2. The quantization method according to claim 1, wherein the first code amount is calculated by cumulating a bin count corresponding to the coded element.

3. The quantization method according to claim 1, further comprising:
selecting, from among the plurality of coefficient absolute value candidates, the one of the coefficient absolute value candidates which has a minimum cost.

4. The quantization method according to claim 1, further comprising:
acquiring a last coefficient position in a quantization coefficient list in which the plurality of quantization coefficients are listed in a reverse scan order based on a cost.

5. The quantization method according to claim 1, wherein, if the coded element corresponds to information that indicates whether or not a quantization coefficient at a position in a direction from a last position toward a top of a quantization coefficient list in which the plurality of quantization coefficients are listed in a reverse scan order is a non-zero, the coded element is binarized under one of a condition that the coded element is present for each of the plurality of quantization coefficients, a condition that the coded element is present for none of each of the plurality of quantization coefficients, and a condition presence of the coded element is set depending on the coefficient position and the parameter.

6. The quantization method according to claim 1, wherein if the coded element corresponds to information that indicates whether or not coefficient absolute values of up to seven non-zero coefficients counted from a last position in a quantization coefficient list in which the plurality of quantization coefficients are listed in a reverse scan order is 1, the coded element is binarized under one of a condition that the coded element is not present for quantization coefficients with a coefficient absolute value smaller than or equal to a non-negative integer and the coded element is present for other quantization coefficient, a condition that the coded element is present for quantization coefficients with a coefficient absolute value smaller than or equal to the non-negative integer and the coded element is not present for other quantization coefficient, and a condition that the coded element is not present for quantization coefficients with a coefficient absolute value smaller than or equal to the non-negative integer and whether or not the coded element is present for other quantization coefficient is set depending on the coefficient position and the parameter.

7. The quantization method according to claim 6, wherein if the coded element corresponds to information that indicates whether or not the coefficient absolute value of a first quantization coefficient with a coefficient absolute value of two or more that is found starting from the last position of the quantization coefficient list is 3 or more, the coded element is binarized under a condition that the coded element is present for none of each of the plurality of quantization coefficients.

8. The quantization method according to claim 1, wherein if the coded element corresponds to information that indicates a sign of a non-zero coefficient in a quantization coefficient list in which the plurality of quantization coefficients are listed in a reverse scan order, the coded element is binarized under a condition that the coded element is not present for quantization coefficients with a coefficient absolute value of zero and the coded element is present for other quantization coefficient.

9. The quantization method according to claim 1, wherein if the coded element corresponds to information obtained by binarizing a coefficient absolute value of a quantization coefficient with a coefficient absolute value of 2 or more, the coded element is binarized under one of a condition that the coded element is present for each of the plurality of quantization coefficients and a condition that the coded element is not present for quantization coefficients with a coefficient absolute value smaller than or equal to a non-negative integer and the coded element is present for other quantization coefficient.

10. The quantization method according to claim 9, wherein if the coded element is present, Golomb coding is applied to a value obtained by subtracting a non-negative integer from the coefficient absolute value of the quantization coefficient to perform coding and a parameter for the Golomb coding is determined depending on the coefficient absolute value of the quantization coefficient, the coefficient position, or the particular parameter.

11. The quantization method according to claim 9, wherein if the coded element is present, a coding method similar to the Golomb coding is applied to a value obtained by subtracting the non-negative integer from the coefficient absolute value of the quantization coefficient to perform coding.

12. The quantization method according to claim 1, wherein the coefficient position is at least one of a block size of the target block, a position of the quantization coefficient in the target block, and a parameter representing a feature of the target block.

13. A coding apparatus comprising:
a processor configured to execute a quantization program; and
a memory configured to store the quantization program, wherein the processor performs, based on the quantization program, operations of:
generating predictive residual signal which indicates a difference between an input image of a moving picture to be coded and a predictive image of the input image;
quantizing a transform coefficient that is obtained by performing an orthogonal transform on the predictive residual signal to obtain a plurality of quantization coefficients;
performing, in parallel, calculations for the respective quantization coefficients to obtain respective coefficient absolute values in a rate distortion optimized quantization operation, each of the calculations in which:
a second code amount of a coded element for each of a plurality of coefficient absolute value candidates of the respective quantization coefficients is obtained by binarizing the coded element under one of a first condition and the second condition, the first condition indicating a presence of the coded element, a second condition for selecting the presence of the coded element according to at least one of the plurality of coefficient absolute value candidates, a coefficient position, and a parameter, wherein the parameter is at least one of a picture type, information indicating a picture to be coded in a reference structure, a prediction mode, a quantization parameter, and a scaling list;
a first code amount of the target block for each of the plurality of coefficient absolute value candidates is calculated based on the second code amount of the coded element;
a cost of coding the target block for each of the plurality of coefficient absolute value candidates is calculated based on the first code amount of the target block and a quantization error; and
a coefficient absolute value candidate having a least cost is selected as a coefficient absolute value from among the plurality of coefficient absolute value candidates.

14. A non-transitory computer-readable recording medium storing a quantization program that causes a computer to execute operations of:
performing scaling on transform coefficients of a target block;
quantizing scaled transform coefficients to obtain a plurality of quantization coefficients;
performing, in parallel, calculations for the respective quantization coefficients to obtain respective coefficient absolute values in a rate distortion optimized quantization operation, each of the calculations in which:
a second code amount of a coded element for each of a plurality of coefficient absolute value candidates of the respective quantization coefficients is obtained by binarizing the coded element under one of a first condition and a second condition, the first condition indicating a presence of the coded element, the second condition for selecting the presence of the coded element according to at least one of the plurality of coefficient absolute value candidates, a coefficient position, and a parameter, wherein the parameter is at least one of a picture type, information indicating a picture to be coded in a reference structure, a prediction mode, a quantization parameter, and a scaling list;
a first code amount of the target block for each of the plurality of coefficient absolute value candidates is calculated based on the second code amount of the coded element;
a cost of coding the target block for each of the plurality of coefficient absolute value candidates is calculated based on the first code amount of the target block and a quantization error; and a coefficient absolute value candidate having a least cost is selected as a coefficient absolute value from among the plurality of coefficient absolute value candidates.

* * * * *